US011169763B2

(12) United States Patent
Lim

(10) Patent No.: US 11,169,763 B2
(45) Date of Patent: Nov. 9, 2021

(54) MOBILE TERMINAL AND ELECTRONIC DEVICE COMPRISING THE SAME

(71) Applicant: LG ELECTRONICS INC., Seoul (KR)

(72) Inventor: Dongjin Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/924,585

(22) Filed: Jul. 9, 2020

(65) Prior Publication Data

US 2021/0064322 A1 Mar. 4, 2021

(30) Foreign Application Priority Data

Aug. 28, 2019 (KR) .......................... 10-2019-0106074

(51) Int. Cl.
*G06F 3/14* (2006.01)
*G06F 1/16* (2006.01)

(52) U.S. Cl.
CPC .......... *G06F 3/1446* (2013.01); *G06F 1/1628* (2013.01); *G06F 1/1649* (2013.01)

(58) Field of Classification Search
CPC ... G09G 5/003; G06F 1/1683; G06F 3/04817; G06F 1/1616; G06F 1/1649; G06F 1/1681; G06F 1/1628; G06F 3/1446
See application file for complete search history.

(56) References Cited

U.S. PATENT DOCUMENTS

| | | | |
|---|---|---|---|
| 10,691,288 B2 * | 6/2020 | Azam | G06F 1/1654 |
| 2012/0060089 A1 * | 3/2012 | Heo | G06F 3/1431 |
| | | | 715/702 |
| 2017/0026625 A1 * | 1/2017 | Lee | H04M 1/0272 |
| 2019/0196771 A1 * | 6/2019 | Kunitomo | G02B 27/0172 |

* cited by examiner

*Primary Examiner* — Abbas I Abdulselam
(74) *Attorney, Agent, or Firm* — Lee, Hong, Degerman, Kang & Waimey

(57) ABSTRACT

The present disclosure provides a device having a mobile terminal and a case to which the mobile terminal is coupled. The device comprises the mobile terminal includes: a terminal body coupled to the case; and a first display coupled to the case. The case includes: a first body formed to accommodate part of the terminal body; a second body having a second display; and a wiring portion for electrically connecting the first and second bodies to each other, and through which data received from the mobile terminal is transferred to the second display. And a controller of the mobile terminal provides a signal indicating a usable state of the second display to a relevant application, and supplies an operation power to the second display based on a request signal from the relevant application, if a coupled state of the terminal body to the first body is sensed.

12 Claims, 21 Drawing Sheets

FIG. 1B
(a) 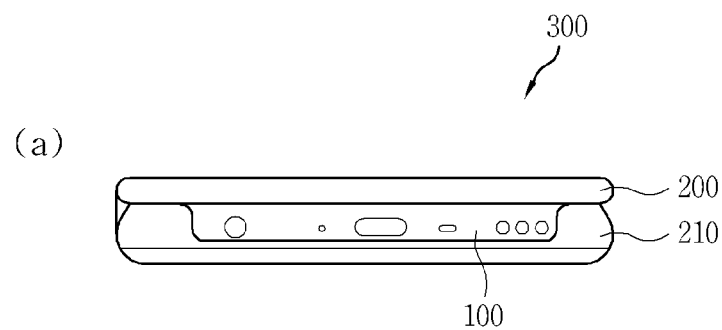
(b) 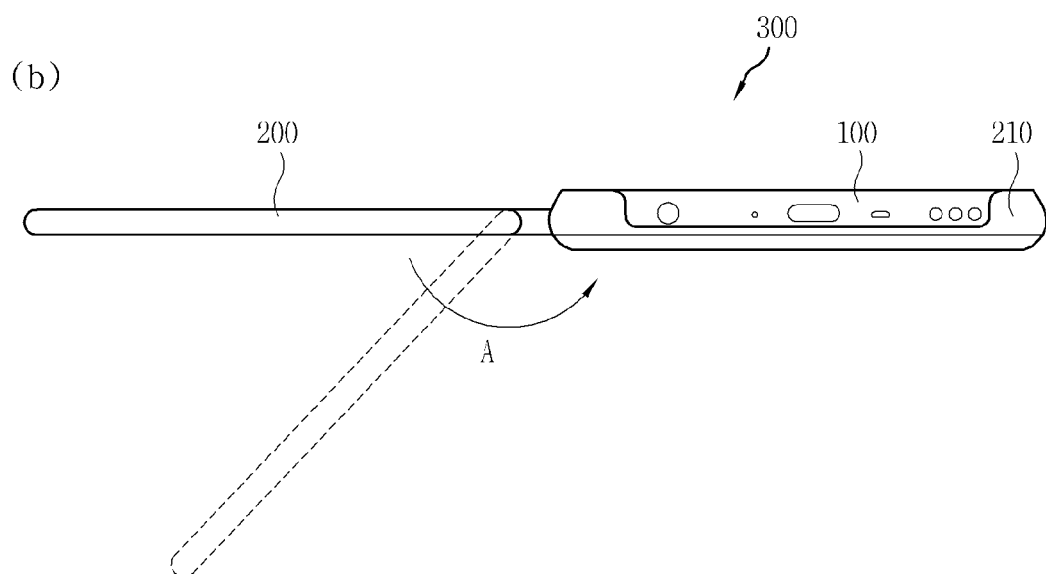
(c) 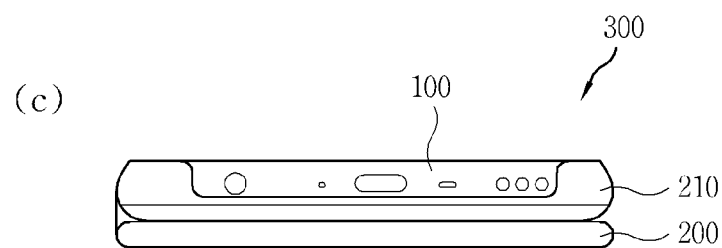

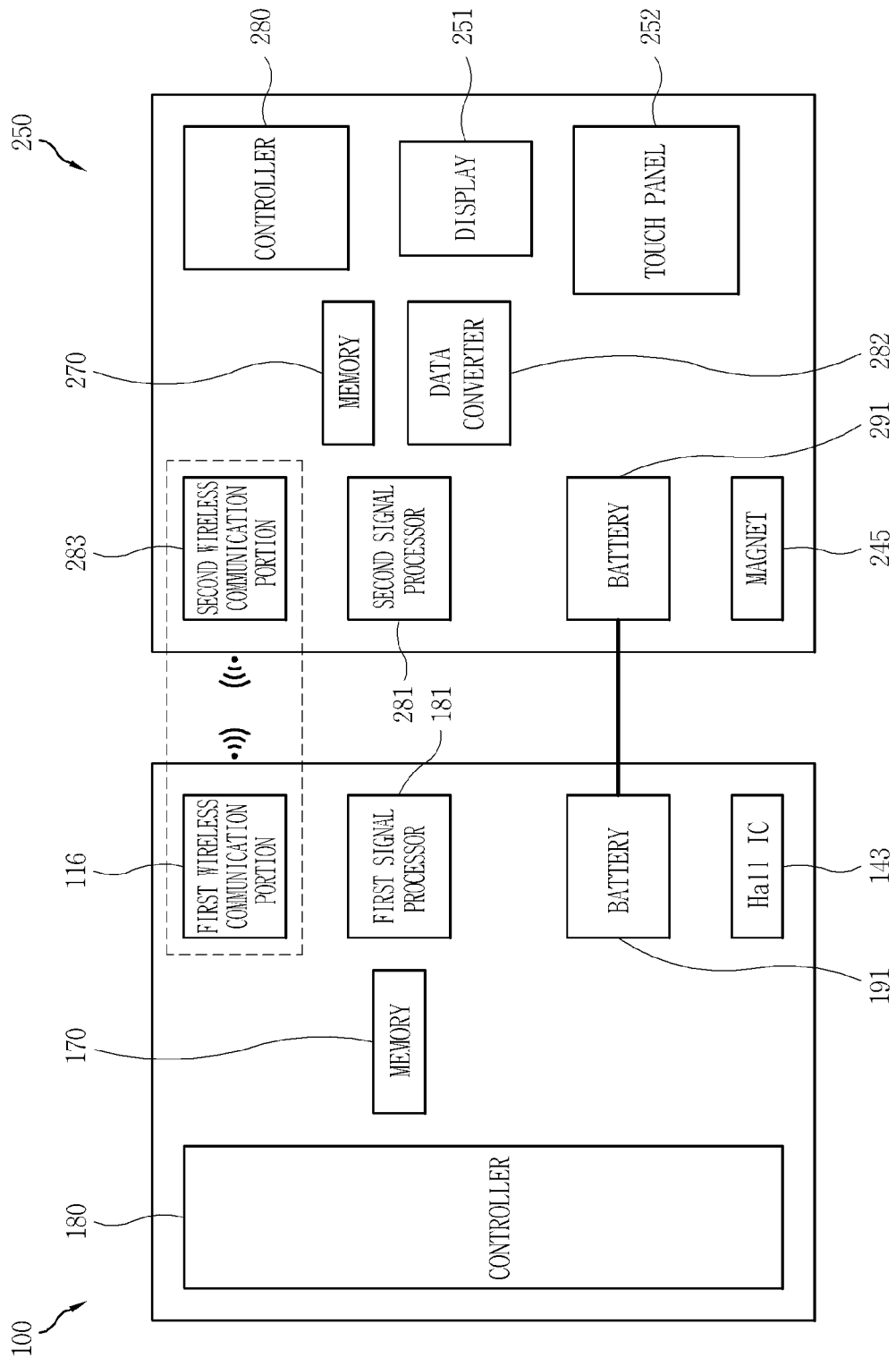

FIG. 5B
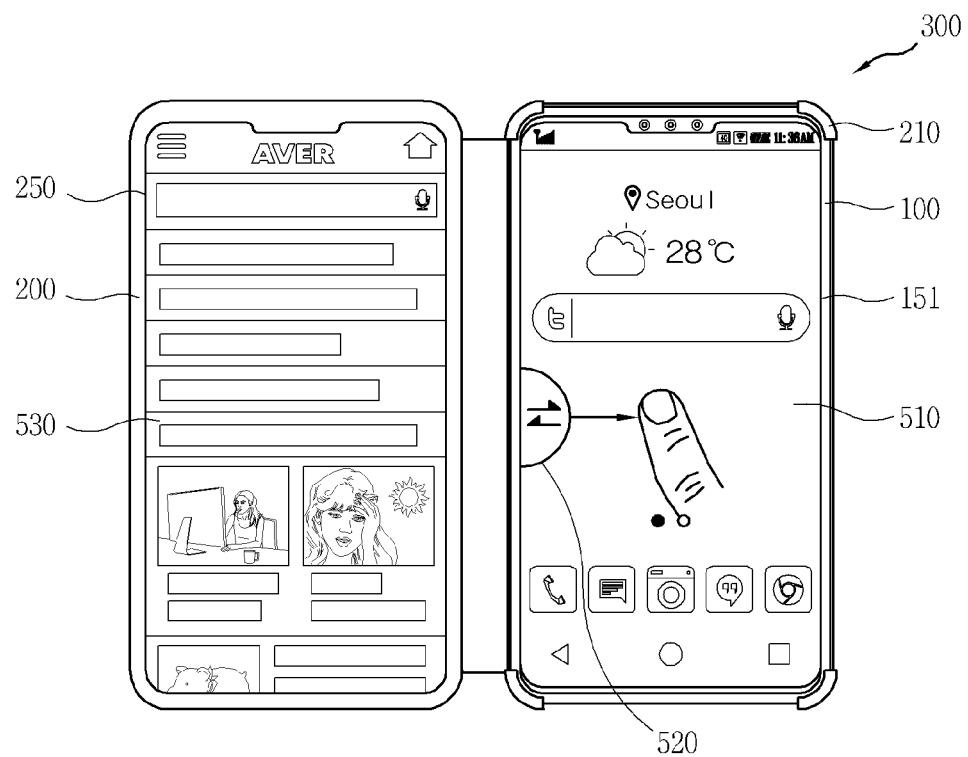
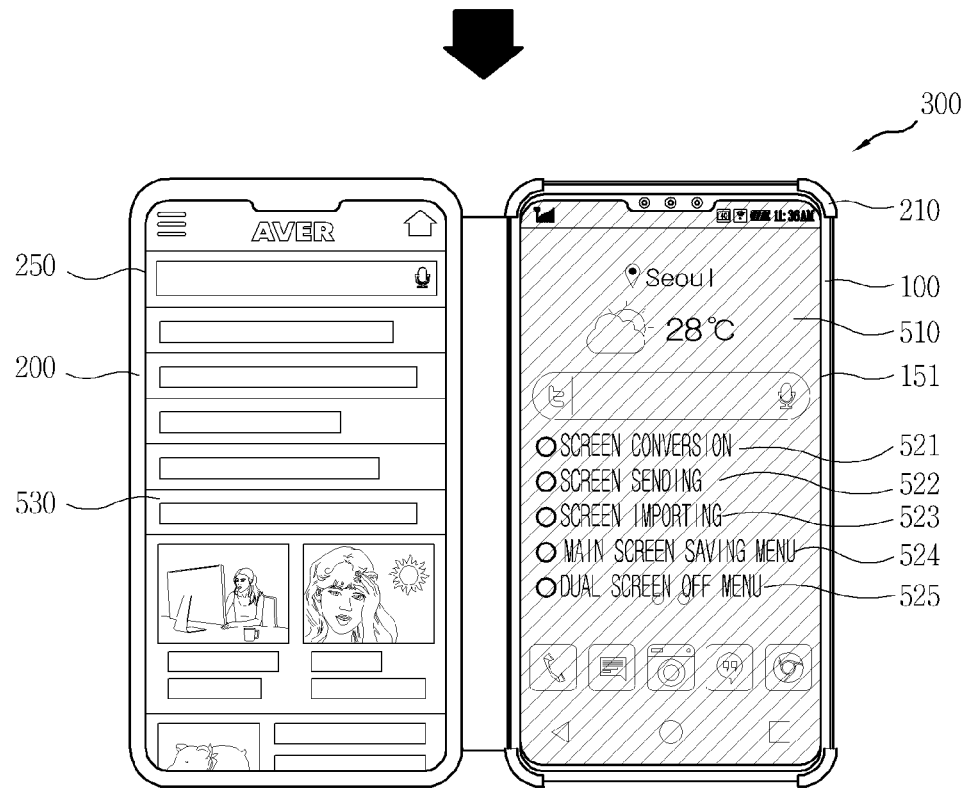

FIG. 5C
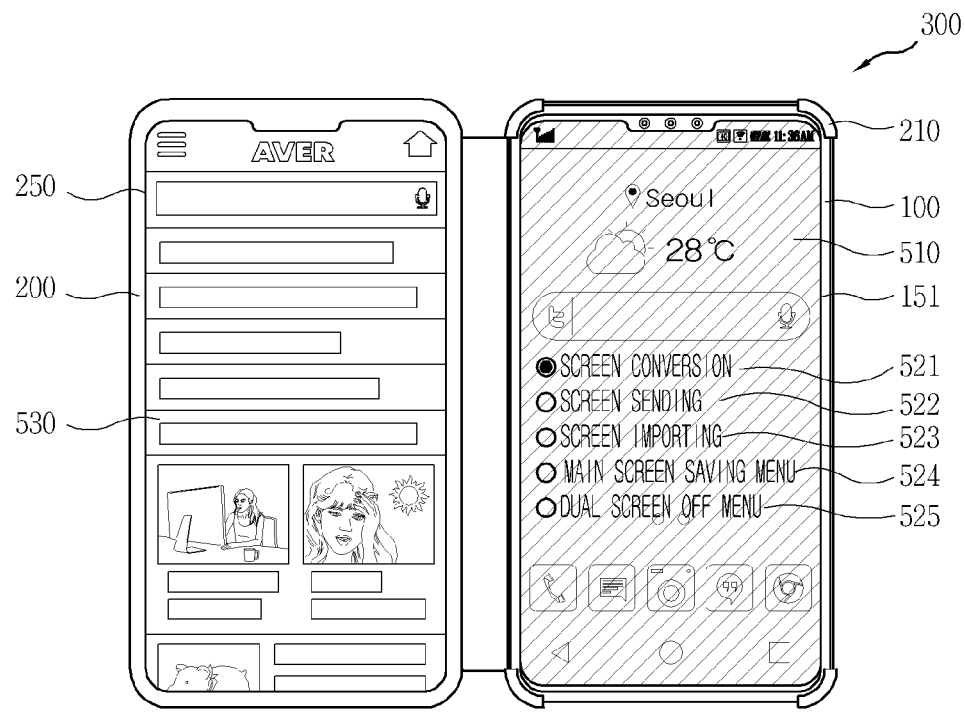
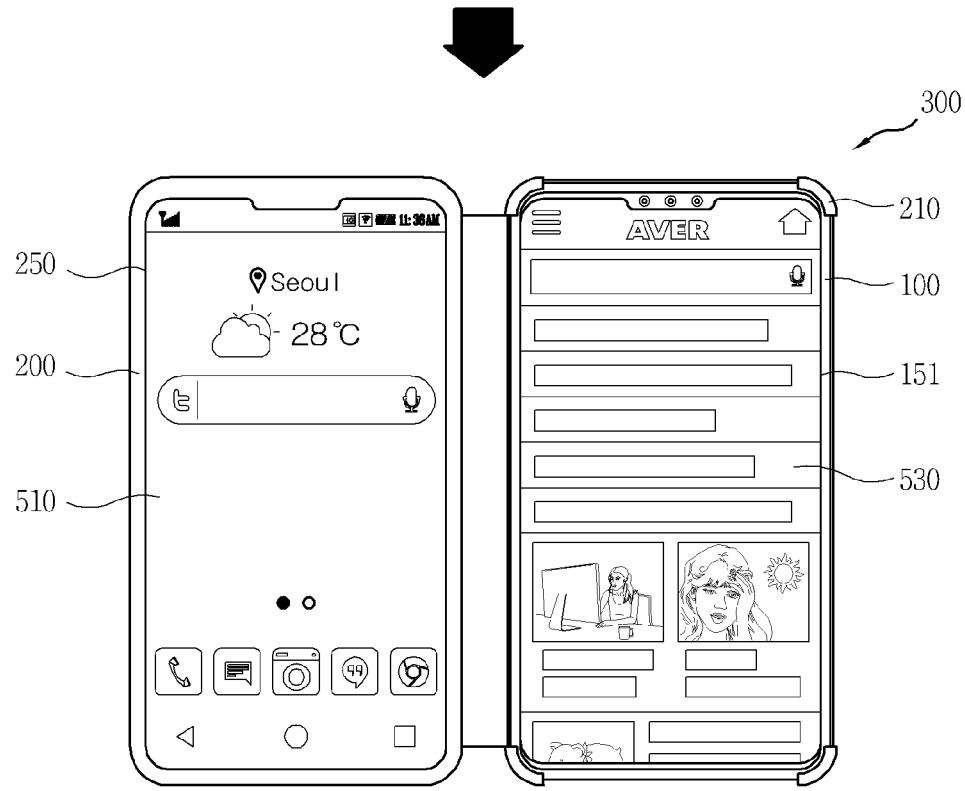

FIG. 5D
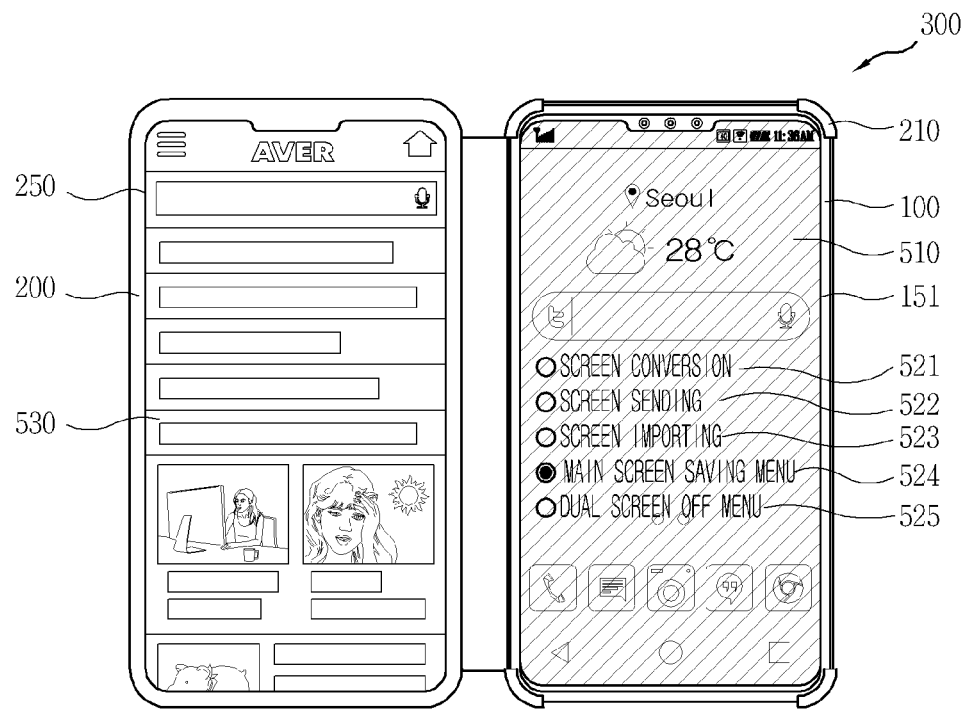
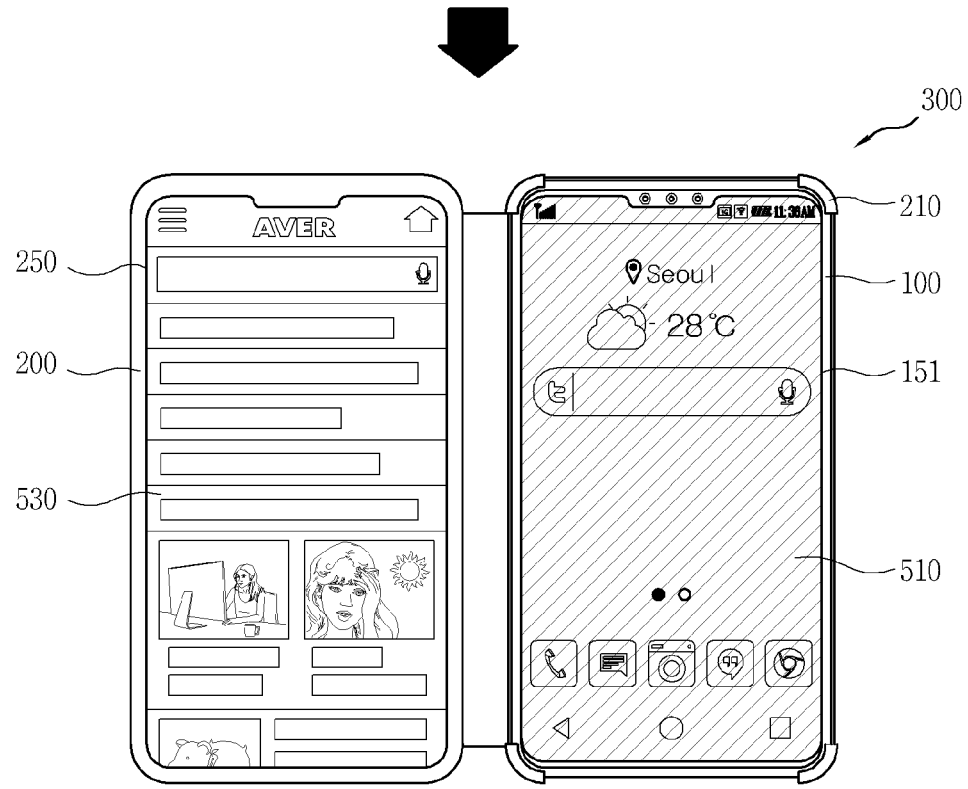

FIG. 5E
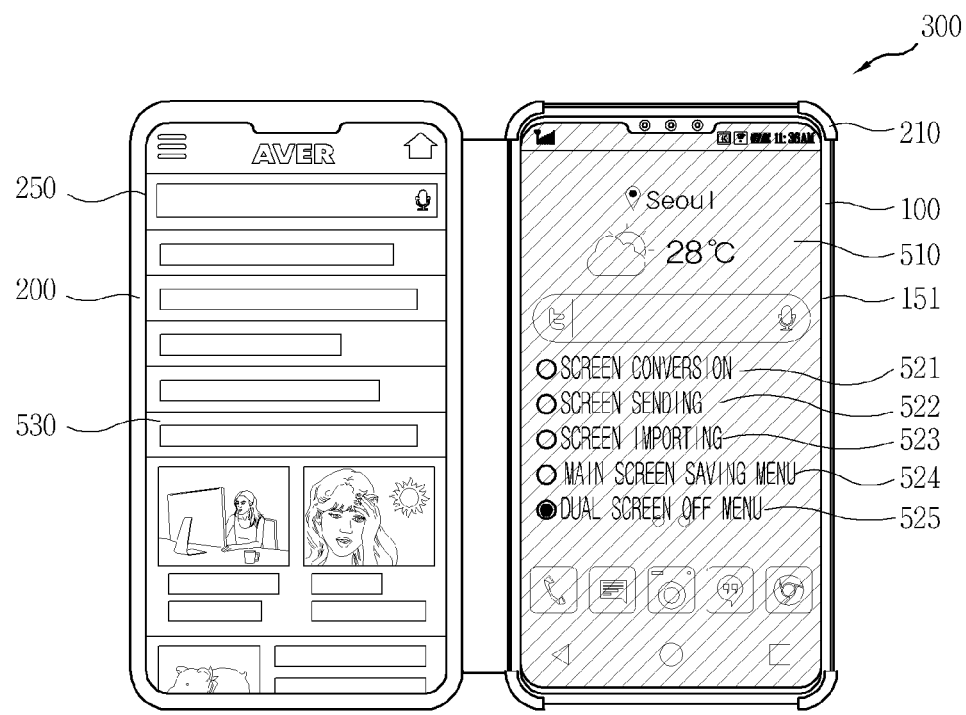
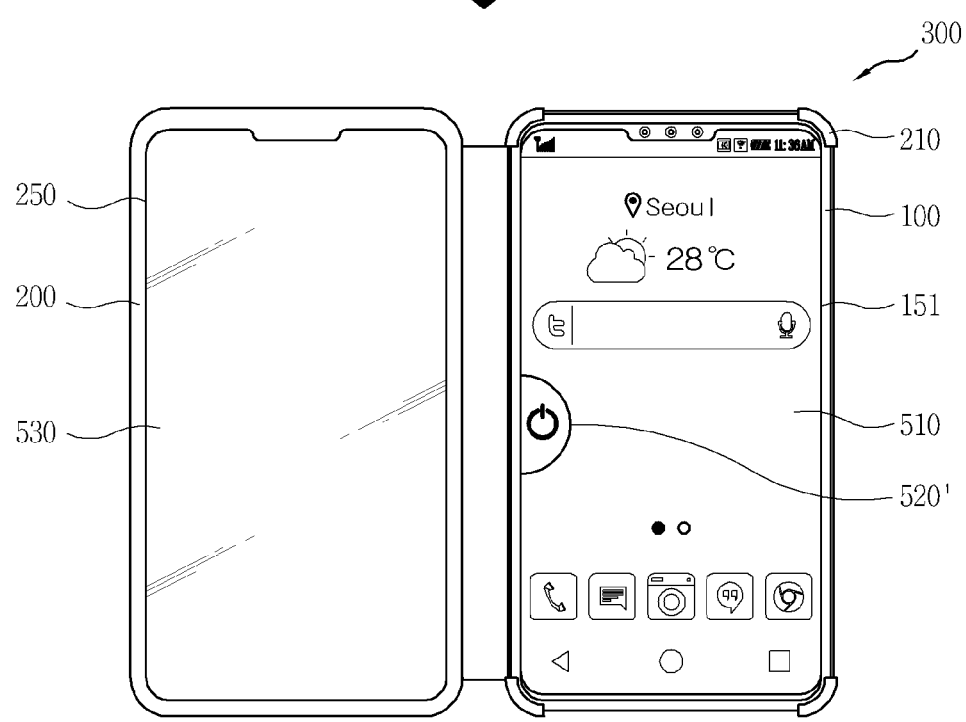

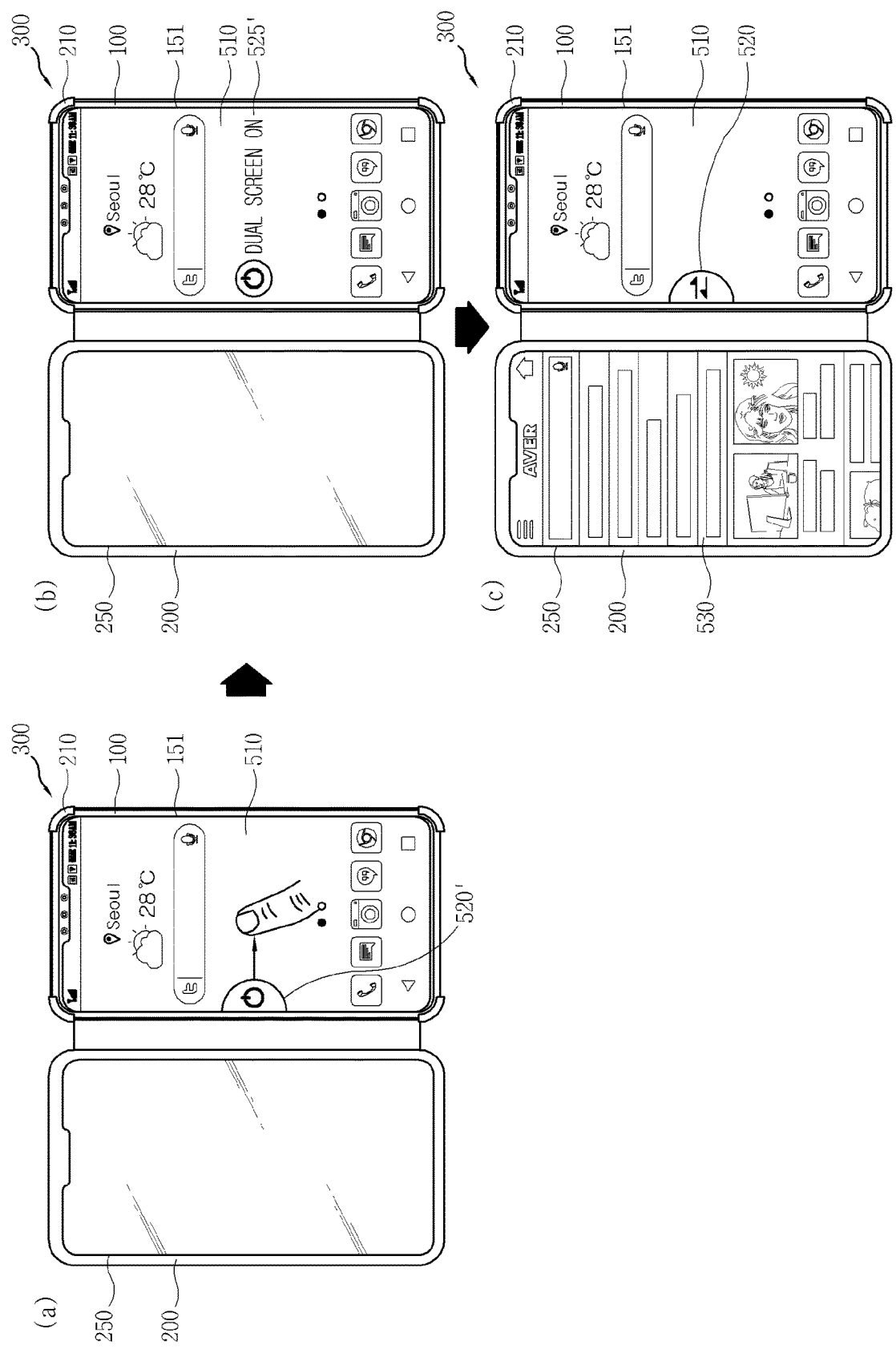

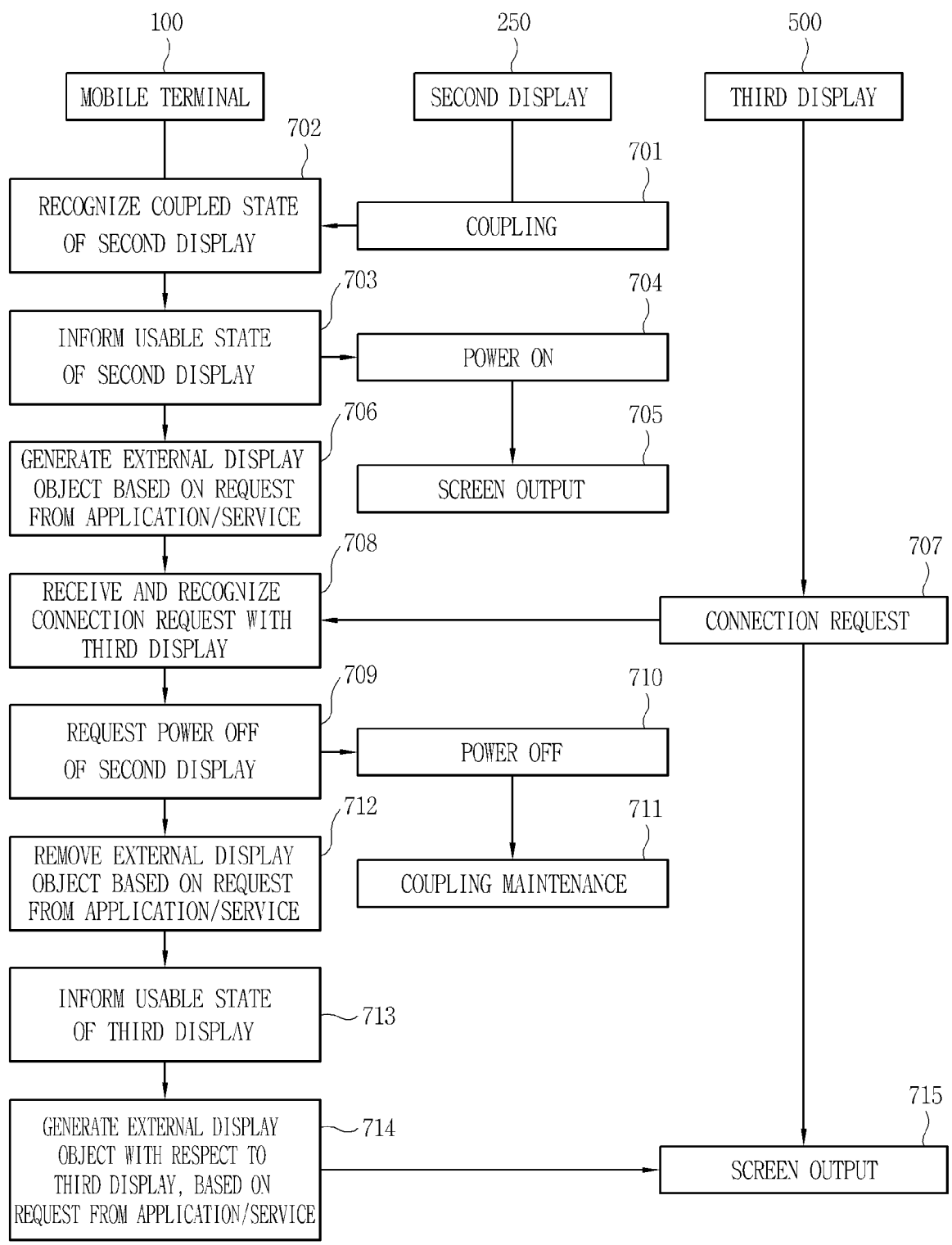

MOBILE TERMINAL AND ELECTRONIC DEVICE COMPRISING THE SAME

CROSS-REFERENCE TO RELATED APPLICATION

Pursuant to 35 U.S.C. § 119(a), this application claims the benefit of the earlier filing date and the right of priority to Korean Patent Application No. 10-2019-0106074, filed on Aug. 28, 2019, the contents of which is incorporated by reference herein in its entirety.

BACKGROUND

1. Technical Field

The present disclosure relates to a mobile terminal, an electronic device having a case to which the mobile terminal has been coupled, and a control method thereof.

2. Description of the Related Art

Terminals may be divided into mobile/portable devices and stationary devices according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Recently, a mobile terminal and an external device interworked with the mobile terminal are implemented together for extension of the usability of the mobile terminal, in order to utilize such various functions more efficiently. In this case, a multi-screen device may be implemented.

Further, a service provision to additionally connect another screen device, or to consecutively view a current screen on another multi-screen device is being extended.

In case of additionally connecting an HDMI screen while one device is used as a multi-screen device, if a plurality of display ports are not provided, the HDMI screen and the multi-screen device cannot be immediately connected to each other.

Further, in case of attempting a mirror-cast connection while one device is used as a multi-screen device, there is a limitation that a virtual display cannot be used together. Accordingly, there was an inconvenience to restrict a connection between the multi-screen device and the mirror cast.

SUMMARY

Therefore, an aspect of the detailed description is to provide an electronic device having a mobile terminal and a case to which the mobile terminal is coupled, the electronic device capable of performing a screen consecutive viewing through a connection of another display device, without a physical connection release, in a coupled state between the mobile terminal having a display and the case having an additional display and interworked with the mobile terminal.

Further, another aspect of the detailed description is to provide an electronic device having a mobile terminal and a case to which the mobile terminal is coupled, the electronic device capable of generating and removing an external display object in a separated manner, without depending on a hardware coupling of the device or a mirror-cast connection.

To achieve these and other advantages and in accordance with the purpose of this specification, as embodied and broadly described herein, there is provided an electronic device having a mobile terminal and a case to which the mobile terminal is coupled, wherein the mobile terminal includes: a terminal body coupled to the case; and a first display coupled to the case, wherein the case includes: a first body formed to accommodate at least part of the terminal body therein; a second body having a second display; and a wiring portion for electrically connecting the first and second bodies to each other, and through which data received from the mobile terminal is transferred to the second display, and wherein a controller of the mobile terminal provides a signal indicating a usable state of the second display to a relevant application when a coupled state of the terminal body to the first body is sensed, and supplies an operation power to the second display based on a request signal from the relevant application.

In an embodiment, the controller of the mobile terminal controls an external display object with respect to the second display to be generated, if the operation power is supplied to the second display and the second display is converted into an activated state.

In an embodiment, if a connection request is received from a third display device in the activated state of the second display, the controller of the mobile terminal may receive a request signal for changing the activated state of the second display into an inactivated state from the relevant application, and may interrupt the supply of the operation power to the second display if the second display is converted into the inactivated state from the activated state based on the request signal.

In an embodiment, the controller of the mobile terminal may remove the external display object with respect to the second display based on a connection release request from the relevant application, in a state that the supply of the operation power to the to the second display is interrupted, and in a state that the coupling of the terminal body is maintained.

In an embodiment, in the state that the coupling of the terminal body is maintained, the controller of the mobile terminal may provide a signal indicating a usable state of the third display to the relevant application, and may generate an external display object with respect to the third display based on a connection request from the relevant application.

In an embodiment, the controller of the mobile terminal may remove the external display object with respect to the second display, if a coupling released state of the terminal body from the first body is sensed.

In an embodiment, if a coupling of the terminal body to the first body is sensed, the controller of the mobile terminal may transfer a callback signal indicating a connected state of the second display to the relevant application, instead of generating an external display object with respect to the second display.

In the electronic device having a mobile terminal and a case to which the mobile terminal is coupled, a screen consecutive viewing may be performed through a connection of another display device, without a physical connection release, in a coupled state between the mobile terminal having a display and the case having a second display. Further, generating and removing an external display object is performed by a software control, without depending on a hardware coupling or connection of the device. Thus, additional configurations or components such as a plurality of DP ports are not required.

BRIEF DESCRIPTION OF THE DRAWINGS

FIGS. 1A and 1B are conceptual views for explaining an electronic device according to the present disclosure.

FIG. 4 is a conceptual view for explaining a control method between a mobile terminal and a display provided at a case, in an electronic device according to the present disclosure.

FIGS. 5A to 5F are conceptual views for explaining various embodiments of a screen control method of a plurality of displays using a first display provided at a mobile terminal, in an electronic device according to the present disclosure.

FIG. 7 is a representative flow chart for explaining a connection method of another multi-screen device while a hardware coupling of a multi-screen device is maintained, in an electronic device according to the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
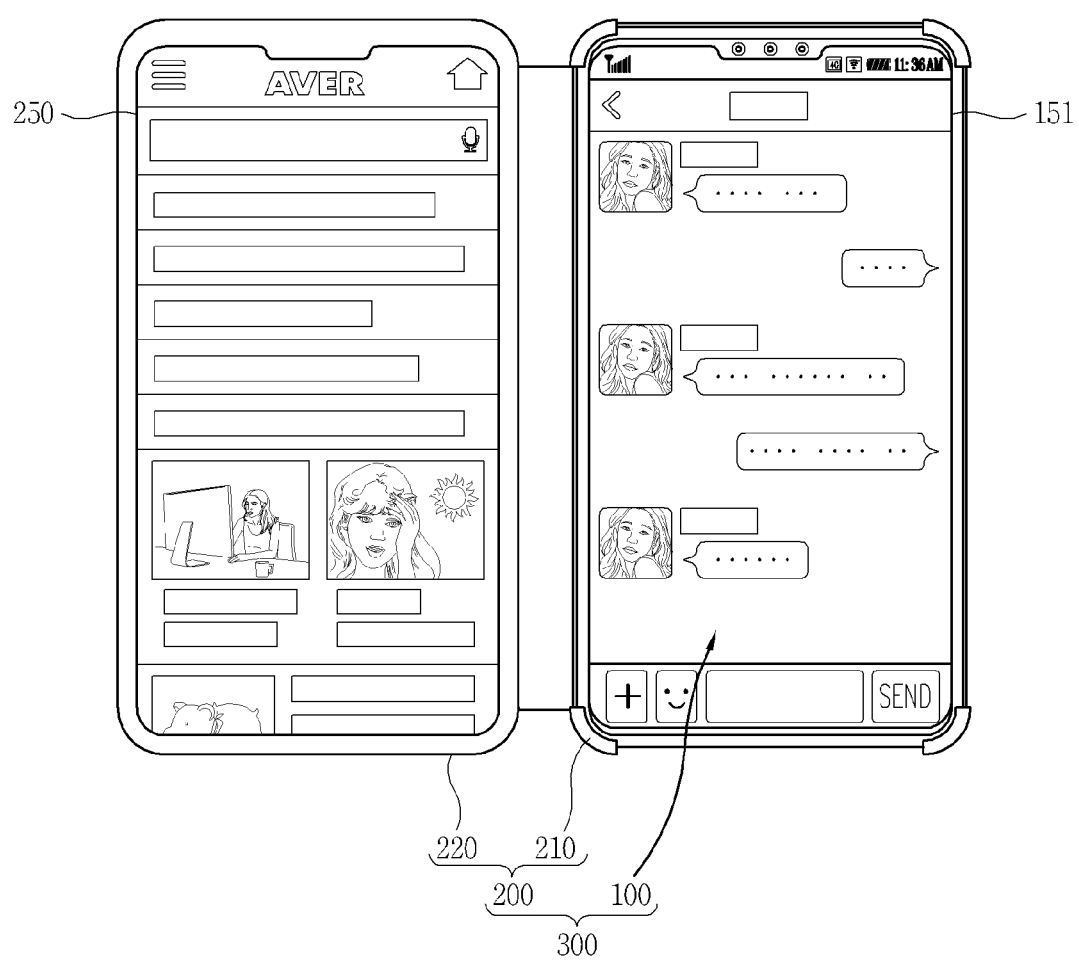

FIGS. 1A and 1B are conceptual views for explaining an electronic device according to the present disclosure.

Referring to the drawings, a mobile terminal 100 is coupled to a case 200, and the mobile terminal 100 and the case 200 coupled to each other form a single electronic device 300.

In this case, the mobile terminal may be one of a portable phone, a smart phone, a notebook computer (laptop computer), a digital broadcasting terminal, personal digital assistants (PDAs), a portable multimedia player (PMP), a navigation, a slate PC, a tablet PC, an ultrabook, and a wearable device (e.g., a smart watch, a smart glass and a head mounted display (HMD)). A detailed description of the mobile terminal will be explained later with reference to FIGS. 3A to 3C.

The case 200 may be a pouch to protect the appearance of the mobile terminal 100, or to cover or accommodate at least one surface of the mobile terminal 100 as an accessory of the mobile terminal 100. The case 200 may be coupled to the mobile terminal, and may be configured to extend the function of the mobile terminal 100.

In the present disclosure, information outputted from the mobile terminal may be processed in relation to the structure or the function of the case 200. As an example, referring to FIG. 1A, the case 200 may be provided with a display (hereinafter will be referred to as a 'second display' 250) interworked with a display (hereinafter will be referred to as a 'first display' 151) of the mobile terminal.

The case is provided with a first body 210 and a second body 220 connected to each other so as to be rotatable with respect to each other, and the second display 250 may be arranged on one of the first and second bodies 210, 220.

For instance, the first body 210 may be formed to accommodate therein at least part of the terminal body. As the rear side of the mobile terminal is accommodated in the first body 210, the first display 151 arranged on the front side of the mobile terminal is exposed to the outside.

In this case, the mobile terminal 100 may be detachably coupled to the first body 210. And the mobile terminal may be formed to sense its coupled state to the first body 210. For the sensing, the first body 210 may be provided with a magnet 245 on one surface thereof which faces the mobile terminal 100. And in an instance that the terminal body is coupled to the first body, a hall sensor 143 configured to sense a magnetic field corresponding to the magnet 245 may be provided on the rear side of the mobile terminal. Once the hall sensor senses the magnetic field, the mobile terminal may recognize its coupled state to the case, and may perform a preset control.

For instance, if a magnetic field is sensed by the hall sensor 143, a controller 180 of the mobile terminal 100 may control a power supply unit 190 to supply an operation current to the second display 250 provided at the second body 220.

That is, the second display 250 provided at the second body 220 may be configured to operate based on a power source supplied from the mobile terminal 100.

The second display 250 may be arranged at the second body 220, and may perform a function to extend a display region of the first display 151, or may be driven independently from the first display 151. For instance, contents related to information outputted to the first display 151 may be mirrored to thus be outputted to the second display 250.

And execution screens of different applications may be output to the first and second displays 151, 250. As another example, an execution screen of one application may be output to the first and second displays 151, 250, in a dividing manner.

The first and second displays 151, 250 are exposed to the outside together in an open state, and the open state may be defined with reference to FIG. 1B.

Further, the mobile terminal 100 is configured to control screen information outputted to the second display 250. For this, at least one of a wired communication link and a wireless communication link may be set between the mobile terminal 100 and the second display 250.

Also, the mobile terminal 100 is configured to supply an operation current to the second display 250, and an operation current may be supplied to the second display 250 from the mobile terminal 100 through wirings provided at the case 200.

Referring to FIG. 1B, the first and second bodies 210, 220 of the case 200 may relatively rotate with respect to each other, between a closed state and a completely open state.

The closed state, a state of (a) shown in FIG. 1B, is a state that the first body 210 of the case 200 covers the first display 151 of the mobile terminal 100, and thereby the first display 151 is blocked by the first body 210. That is, a state that the first display 151 is covered by the second display 250 may be the closed state. In the closed state, the mobile terminal 100 and the case 200 are overlapped with each other in a thickness direction of the mobile terminal, with a form of a diary. This enhances a user's portability.

In this case, front surfaces of the first and second displays 151, 250 face each other. The front surfaces may be external surfaces where visual information is displayed and a touch input is received.

In the closed state, the second body 220 rotates on the basis of the first body 210. As a result, the closed state is converted into an open state. The open state is a state that the first display 151 is not blocked by the second display 250. And a state that an angle formed by the first and second displays 151, 250 has a specific value other than 0° may be defined as the open state.

FIG. 1B(b) shows a state that the first and second displays 151, 250 form 180° with each other, among an open state. The aforementioned FIG. 1A shows a state that the first and second displays 151, 250 form 180° with each other. In the open state, the first and second bodies 210, 220 may be fixed at a specific angle. For this, a fixing means may be provided at the case 220.

As shown in FIG. 1B(b), the first and second bodies 210, 220 may perform a relative rotation more in a direction of 'A'. Accordingly, as shown in FIG. 1B(c), the first and second bodies 210, 220 may perform a relative rotation by 360° to the maximum. This may be defined as a 'complete open state' among the open state.

Further, if the first and second bodies 210, 220 perform a relative rotation by more than 180° but less than 360°, this may be defined as a 'bent state'. The 'bent state' of the first body 210 towards a rear surface of the case may be sensed by a connection portion for connecting the first and second bodies 210, 220 to each other, or by a sensor additionally provided at the connection portion.

In this case, the first and second bodies 210, 220 are overlapped with each other, and the first and second displays 151, 250 are arranged to be towards the outside, respectively. That is, the first and second displays 151, 250 face directions opposite to each other.

The mobile terminal may be formed to sense the closed state and the open state. For instance, the mobile terminal may include an illumination sensor for sensing a peripheral illumination, and the controller 180 of the mobile terminal 100 may sense one of the closed state and the open state according to an illumination sensed by the illumination sensor.

Further, the controller 180 may additionally sense a complete open state among the open state.

The electronic device 300 of the present disclosure may perform an operation to control the first and second displays 151, 250 in association with the open state and the closed state. For instance, the first and second displays 151, 250 may be driven in an inactivated state in the closed state, and at least one of the first and second displays 151, 250 may be activated if the closed state is converted into the open state.

For instance, if the closed state is converted into the open state, both of the first and second displays 151, 250 may be converted into an activated state. Here, different home screen pages may be output to the first and second displays 151, 250, or the same home screen page may be output to the first and second displays 151, 250. Alternatively, various information may be output to the first and second displays 151, 250 according to a situation.

As another example, if the closed state is converted into the open state, the first display 151 may be converted into an activated state, and the second display 250 may maintain an inactivated state.

The second display 250 may include a touch sensor for sensing a touch (input) applied thereto.

The second display 250 may be configured to sense a touch even in the inactivated state.

In relation to a touch sensing by the touch sensor, if a touch applied to the second display 250 is a preset type of touch, the second display 250 may be driven in an activated state in the open state.

If a touch is applied to the second display 250, the second display 250 may transmit a touch signal corresponding to the touch to the mobile terminal 100. And if the touch according to the received touch signal is a preset type of touch, the mobile terminal 100 may transmit, to the second display 250, a signal corresponding to a control command to activate the second display 250.

Then, the second display 250 may be activated by the signal received from the mobile terminal 100.

In order to implement the operation of the aforementioned electronic device, the case may be provided with a new structure. Hereinafter, the structure of the case will be explained in more detail.

Figure 2A:
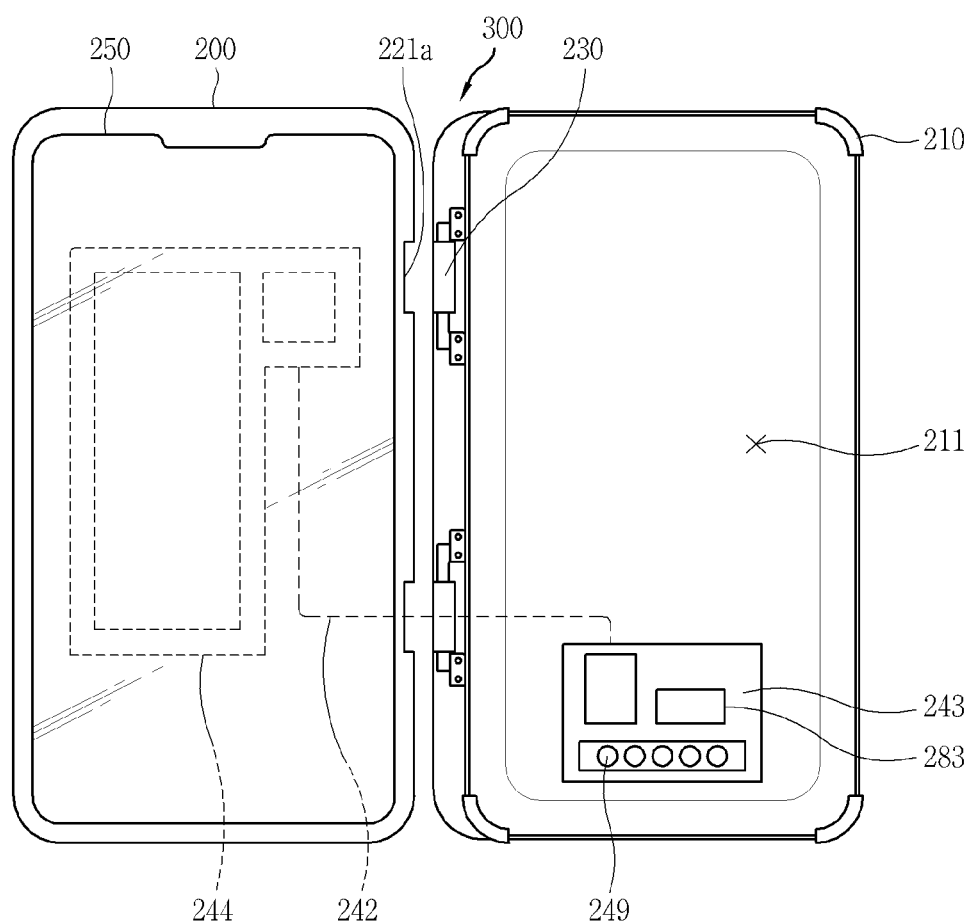
FIGS. 2A to 2C are conceptual views for explaining a main structure of an electronic device according to the present disclosure.
Figure 2B:
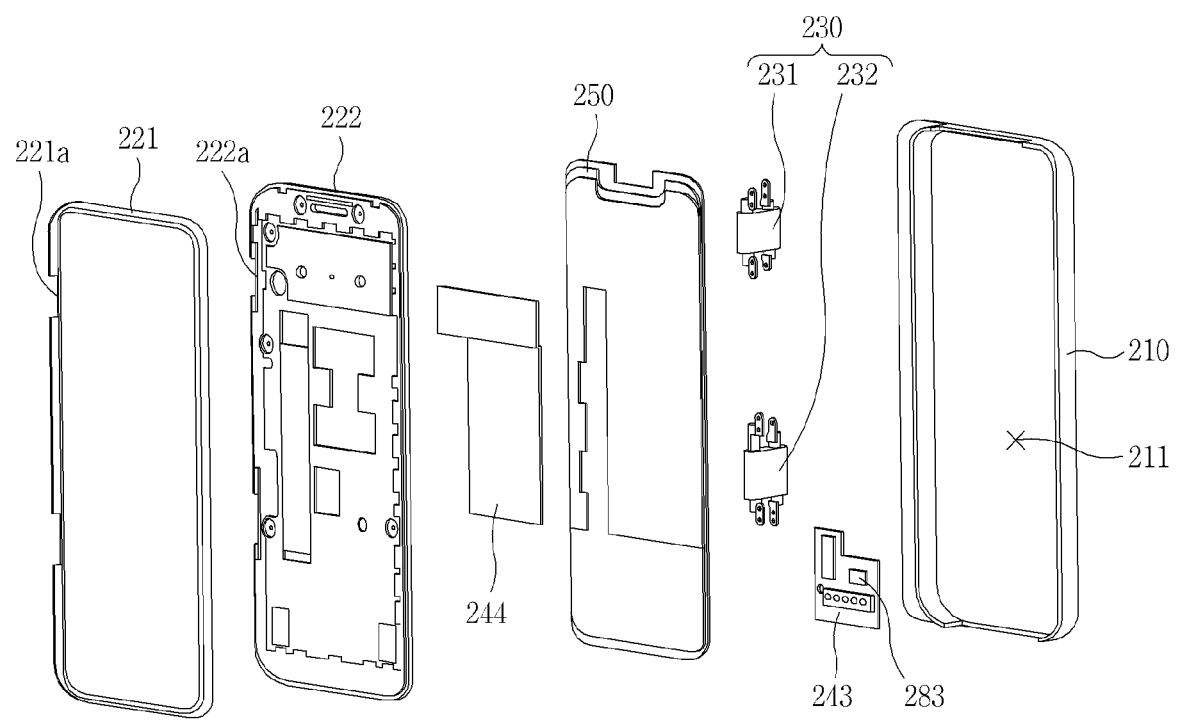
Figure 2C:
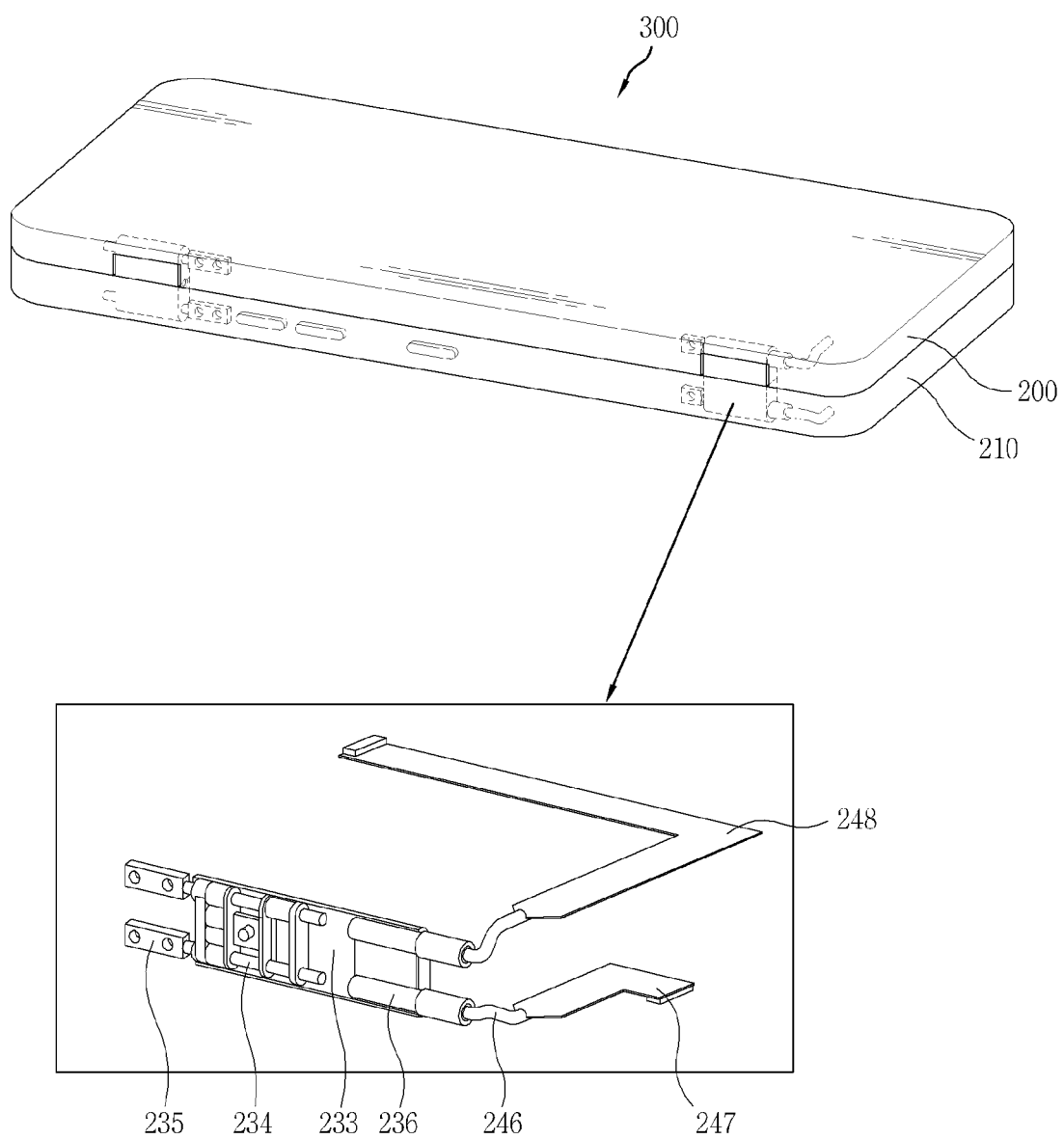

FIGS. 2A to 2C are conceptual views for explaining a main structure of an electronic device according to the present disclosure.

The first body 210 of the case 200 is provided with an accommodation space 211 for accommodating a rear surface of the terminal body. The first body accommodates therein at least part of the mobile terminal through the accommodation space 211, and the rear surface of the mobile terminal is arranged on a bottom surface of the accommodation space 211. However, the present disclosure is not limited to this. For instance, the first body may be formed as a plate coupled to the rear surface of the mobile terminal, or may be configured to be coupled to a side surface of the mobile terminal.

The second body 220 where the second display 250 is arranged is rotatably coupled to the first body by a connection portion 230. That is, the connection portion 230 is arranged between the first and second bodies 210, 220, thereby coupling the first and second bodies 210, 220 to each other for a relative rotation.

Referring to the drawings, the second body 220 may be provided with a first cover 221, a second cover 222 and the second display 250. An accommodation groove 221a for accommodating at least a part of the connection portion 230 may be formed at the first cover 221. The second cover 222 may be coupled to the first cover 221, and may serve as a frame where various types of electronic components are mounted. For example, a second printed circuit board to be explained later may be mounted to the second cover 222.

The second cover 222 may be rotatably coupled to the connection portion 230. A groove 222a may be formed at the second cover 222 at a position corresponding to the accommodation groove 221a of the first cover 221. And the connection portion 230 may be arranged at the groove 222a. In this case, the second display 250 may be mounted to the second cover 222.

The connection portion 230 may be provided with a first hinge 231 and a second hinge 232 arranged along a side surface of the first body 210 in a spaced state from each other. The first and second hinges 231, 232 may be provided with a hinge body 233 and a hinge shaft 234, respectively.

A hinge groove (not shown) is formed at the hinge body 233, and the hinge shaft 234 is inserted into the hinge groove to thus enable a relative rotation of the first and second bodies 210, 220. The hinge shaft 234 may be provided in plurality in number, and a coupling portion 235 coupled to the first and second bodies 210, 220, respectively may be arranged at one side of the hinge shaft 234.

Here, the case 200 includes a wireless communication portion 283 and a wiring portion 242. This may allow the mobile terminal 100 to control the second display 250.

The wireless communication portion 283 is arranged at the first body 210, and performs a short-distance wireless communication with the mobile terminal. A wireless communication portion (hereinafter, will be referred to as a 'first wireless communication portion') which performs a short-distance wireless communication with a wireless communication portion of the case 200 (hereinafter, will be referred to as a 'second wireless communication portion') may be arranged at the mobile terminal 100.

The first wireless communication portion 116 (refer to FIG. 3C) transmits a wireless signal to the rear side of the mobile terminal 100, and the second wireless communication portion 283 is arranged at the first body 210 so as to face the first wireless communication portion 116 to thus receive the wireless signal. The first wireless communication portion 116 and the second wireless communication portion 283 may be provided Keyssa chips which transceive (transmit and receive) wireless data, for instance. And the Keyssa chips may be arranged at a position where a separation distance is within many (a few) centimeters in a thickness direction of the mobile terminal. Accordingly, the first wireless communication portion 116 and the second wireless communication portion 283 communicate with each other by a short-distance communication method having a transmission distance of about many centimeters.

As shown, the first body 210 may be provided with a first printed circuit board (PCB) 243 where the second wireless communication portion 283 is arranged, and the second body 220 may be provided with a second printed circuit board (PCB) 244 disposed at a lower side of the second display 250 and electrically connected to the first printed circuit board 243 by the wiring portion 242. The second printed circuit board 244 may transmit a control signal received from the mobile terminal 100 to the second display 250, by being connected to the second display 250.

That is, the second printed circuit board 244 may transmit data transceived (transmitted and received) between the first wireless communication portion 116 and the second wireless communication portion 283, to the second display 250.

The wiring portion 242 is a part for electrically connecting the first and second bodies 210, 220 to each other through the connection portion 230. And wireless signals (or data) received via the short-distance wireless communication with the mobile terminal 100 may be transmitted to the second display 250 through the wiring portion 242. For such a connection, a connection passage along which the wiring portion 242 passes may be formed at the connection portion 230.

For example, an accommodation space for accommodating at least a part of the wiring portion 242 is formed at one of the first and second hinges 231, 232. More specifically, the first hinge 231 may be positioned to be more adjacent to the upper side of the mobile terminal 100 than the second hinge 232, and the second hinge 232 may be positioned to be more adjacent to the lower side of the mobile terminal 100 than the first hinge 231. The second PCB 244 is arranged to be adjacent to the lower side end of the case 200. Accordingly, the first wireless communication portion 116 and the second wireless communication portion 283 are arranged at the lower sides of the case 200 and the mobile terminal 100, respectively.

Under the structure, the accommodation space may be formed at the second hinge 232. The second hinge 232 is provided with an extension portion 236 extended from the hinge body 233, and cables 246 extended to the first and second bodies 210, 220, respectively may be provided at the extension portion 236. The accommodation space is formed at the extension portion 236, and the cables 246 are accommodated in the accommodation space. A first flexible PCB 247 and a second flexible PCB 248 are arranged at two ends of the cables 246, and the first and second flexible PCBs 247, 248 are electrically connected to the first and second PCBs 243, 244. Under the structure, a signal to control the second display 250 may be wirelessly transmitted to the first body 210 of the mobile terminal, and may be transmitted to the second body 220 by wire.

Referring to the drawings, a power terminal (e.g., a pogo-pin 249) contacting a power supplying terminal (not shown) of the mobile terminal may be arranged at the first PCB 243, so as to receive a power source from the mobile terminal. The power terminal 249 is electrically connected to the wiring portion 242 in order to supply a power source to the second display 250. Under the structure, the power source to be supplied to the second display 250 may be transmitted by a wired path in the mobile terminal.

Under the aforementioned structure, the electronic device performs a control operation by interworking the first and second displays 151, 250 by using a short-distance wireless communication and a wired power supplying path. Hereinafter, the structure and the function of the mobile terminal will be firstly explained in more detail, and then the control operation will be explained.

Figure 3A:
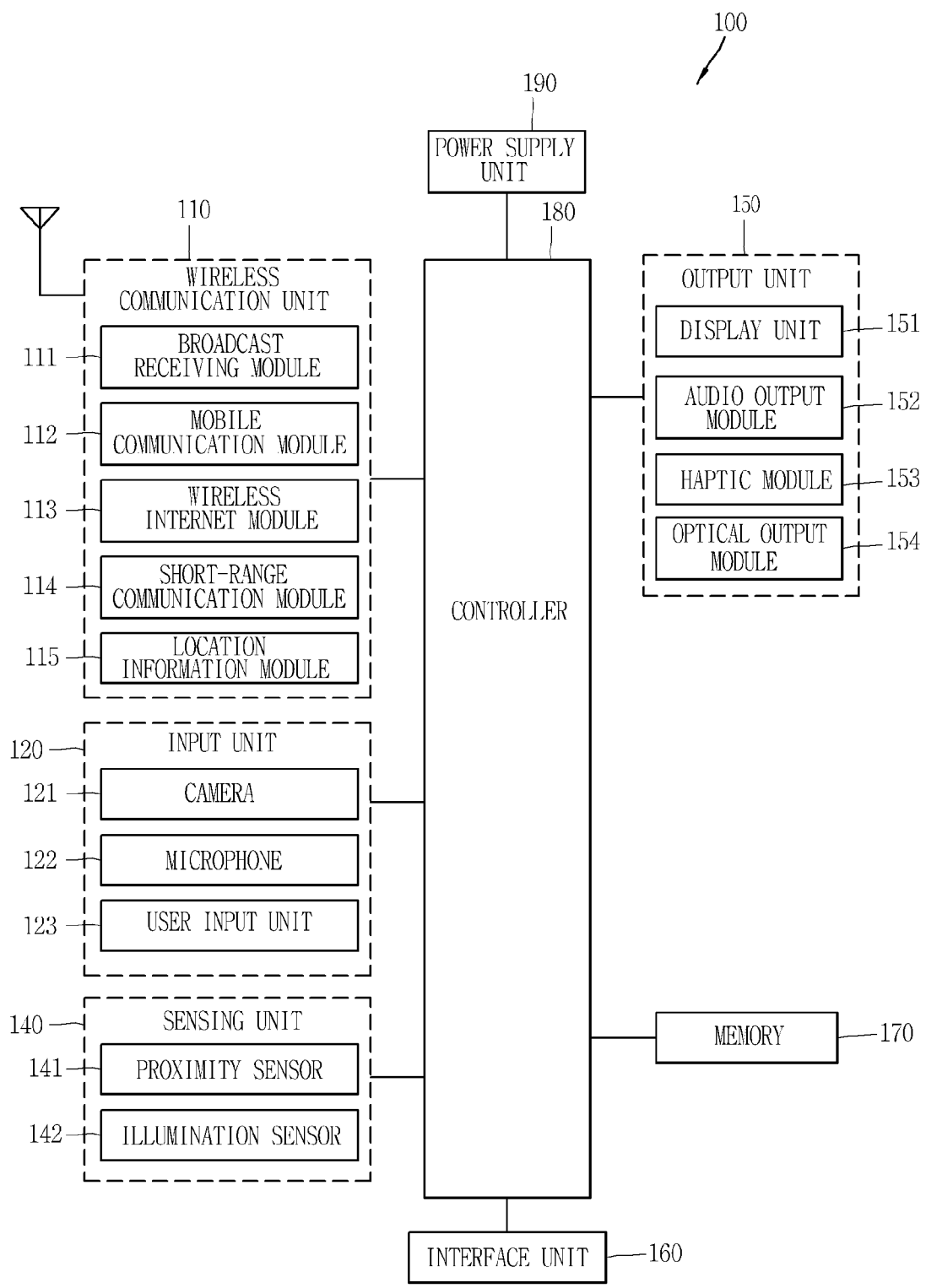
FIGS. 3A to 3C are conceptual views for explaining an embodiment of a mobile terminal according to the present disclosure.
Figure 3B:
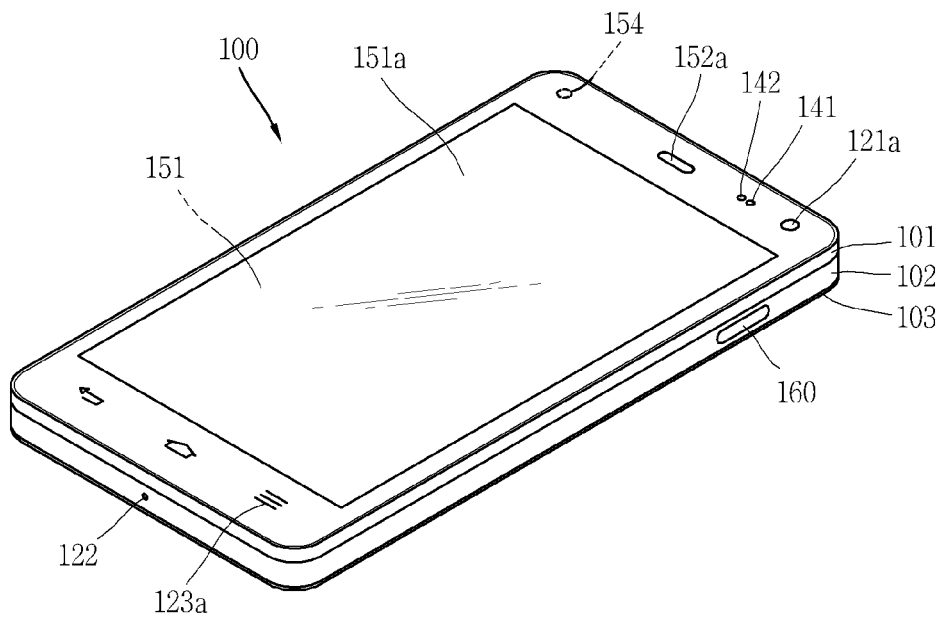
Figure 3C:
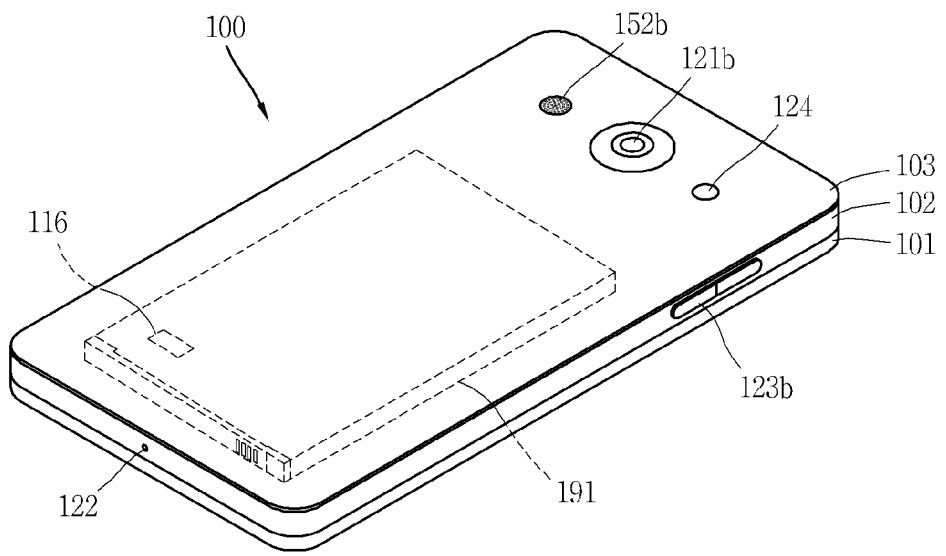

FIGS. 3A, 3B, and 3C are conceptual views illustrating an example of a mobile terminal related to the present disclosure. The mobile terminal 100 according to the present disclosure may be coupled on the case of the electronic device described above.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIGS. 3A to 3C, FIG. 3A is a block diagram of a mobile terminal in accordance with one exemplary embodiment of the present disclosure, and FIGS. 3B and 3C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 3B and 3C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 3B and 3C, description will be given of the exemplary mobile terminal 100 in which the front surface of the terminal body is shown having the display 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display 151 may form a touch screen together with the touch sensor, and in this case, the touch screen may function as the user input unit (123, see FIG. 3A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 3A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 3A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to extend the function of the mobile terminal 100. Another example of the accessory may be a touch pen for assisting or extending a touch input onto a touch screen.

As aforementioned, in the electronic device 300 according to the present disclosure, the first wireless communication portion 116 (refer to FIG. 3C) provided at the rear side of the mobile terminal, and the second wireless communication portion 283 provided at the first body 210 of the case 200 are configured to perform a data communication with each other. Hereinafter, a data communication method between the first and second wireless communication portions 116, 283 will be explained in more detail with reference to the attached drawings. FIG. 4 is a conceptual view for explaining a control method between the mobile terminal and the display provided at the case, in the electronic device according to the present disclosure.

The mobile terminal 100 according to the present disclosure may be coupled to the first body 210. In the case that the mobile terminal is coupled to the first body 210, the first and second wireless communication portions 116, 283 face each other.

The first wireless communication portion 116 provided at the mobile terminal 100 may be included in the wireless communication unit 110 aforementioned with reference to FIG. 3A. The wireless communication unit 110 of the mobile terminal 100 may be formed of a plurality of wireless communication portions, and the plurality of wireless communication portions may be arranged at different positions on the mobile terminal 100. Especially, in the mobile terminal 100 according to the present disclosure, the first wireless communication portion 116 may be provided at the rear side of the mobile terminal 100. Accordingly, in the case that the mobile terminal 100 is coupled to the first body 210, the first wireless communication portion 116 may perform a data communication with the second wireless communication portion 283 provided at the first body 210.

The first and second wireless communication portions 116, 283 according to the present disclosure may be configured as contactless connectors for data communication. The contactless connectors are electromagnetic connectors which form electromagnetic communication links. As the contactless connectors are arranged on different devices, electromagnetic communication links may be set.

The first and second wireless communication portions 116, 283 may be configured as transceivers for converting electric signals into electromagnetic (EM) signals. A transceiver of one of the first and second wireless communication portions 116, 283 may convert electric signals into EM signals. The EM signals are received by another transceiver, and said another transceiver converts the EM signals into electric signals.

The term of "transceiver" used in the present disclosure may indicate a device such as an integrated circuit (IC) including a transmitter (Tx) and a receiver (Rx) to transmit and receive information (data). Generally, the transceiver can operate at a half-duplex mode (transmission and reception are alternately performed), or a full-duplex mode (transmission and reception are simultaneously performed). The transceiver may be configured as one of a transmitter and a receiver. The transceiver may include additional integrated circuits for a transmission function and a reception function. The terms of "contactless", "coupled-pair" and "proximity coupling" indicate an electromagnetic (EM) connection and a signal transmission, rather than an electric (wired) connection between the first and second wireless communication portions 116, 283, as used in the present specification.

As used in the present specification, the term of "contactless" may indicate a carrier-assisted dielectric coupling system which can have an optimum range within a range of 0~5 cm. A connection may be verified by proximity of one of the first and second wireless communication portions 116, 283 to another. A plurality of contactless transmitters and receivers may occupy a small space. An electromagnetically (EM)-set contactless link may be a point-to-point link, unlike a wireless link which generally broadcasts to some points.

The first and second wireless communication portions 116, 283 may be connected to each other by wire in order to transmit data from one position to another position, or may form a point-to-point contactless communication link requiring no physical wired connection or a coupled-pair. The transceivers may be extremely high frequency (EHF) transceivers.

For instance, in the case that the mobile terminal 100 is coupled to the first body 210, the first wireless communication portion 116 of the mobile terminal 100 and the second wireless communication portion 283 of the first body 210 are configured to face each other and to be positioned within a preset distance. Accordingly, a contactless communication link may be formed between the first and second wireless communication portions 116, 283.

Data transmission may be performed between the mobile terminal 100 and the second display 250, through the EHF transceivers included in the first and second wireless communication portions 116, 283.

The second wireless communication portion 283 which transceives data to/from the second display 250, i.e., the EHF transceiver may be provided at the first body 210, as aforementioned with reference to FIGS. 2A to 2C.

The second wireless communication portion 283 provided at the first body 210 is configured to transceive (transmit and receive) data to/from the second display 250 by wire, through the wiring portion 242 included in the connection portion 230.

As aforementioned, as the mobile terminal 100 is coupled to the first body 210, the EHF transceivers included in the first and second wireless communication portions 116, 283 may be coupled to each other in a proximity manner.

The pair coupling of the EHF transceivers included in the first and second wireless communication portions 116, 283 may provide a non-contact data path (passage or channel). In some embodiments, the data passages may be formed in one direction (e.g., a data flow from the mobile terminal 100 to the second display 250 through a specific passage), or in two directions (e.g., a bi-directional data flow between the mobile terminal 100 and the second display 250 through a specific passage).

The first and second wireless communication portions 116, 283 according to the present disclosure may be configured to transceive various types of data. For instance, the data may be one of graphic data, audio data, video data, touch event data and a combination thereof.

That is, the second display 250 provided at the second body 220 may be configured to operate based on a power source supplied from the mobile terminal 100.

Here, as aforementioned, the power source may be transferred to the second display 250 through the first PCB 243 electrically connected to the mobile terminal 100, the wiring portion 242 provided at the connection portion 230, and an electric connection passage of the second PCB provided at the second body 220.

That is, as shown in FIG. 4, the battery 191 of the mobile terminal 100 is configured to supply an operation current (or a power source) to a battery 291 of the second display 250, through the first PCB 243, the wiring portion 242 provided at the connection portion 230, and an electric connection passage of the second PCB provided at the second body 220.

As aforementioned, the mobile terminal 100 may be detachably coupled to the first body 210. And the mobile terminal may be formed to sense its coupled state with the first body 210. For the sensing, the first body 210 may include a magnet 245 on one surface thereof which faces the mobile terminal 100. And the mobile terminal may include a hall sensor 143 at a rear side thereof, the hall sensor for sensing a magnetic field corresponding to the magnet 245 when the terminal body is coupled to the first body. If the hall sensor senses the magnetic field, the mobile terminal may recognize its coupled state with the case, and may perform a preset control.

For instance, if a magnetic field is sensed by the hall sensor 143, the controller 180 of the mobile terminal 100 may control the power supply unit 190 to supply an operation current to the second display 250 provided at the second body 220.

That is, the second display 250 provided at the second body 220 may be configured to operate based on a power source supplied from the mobile terminal 100.

If the operation current is supplied to the second display 250, a system of the second display 250 may undergo a booting and initialization process, thereby being in an operable standby state.

Here, the second display 250 is in one of an activated state and an inactivated state. Even in an inactivated state of the second display 250, a touch sensor (or a touch panel 252) provided at the second display 250 may be driven in an activated state to sense a touch applied to the second display 250.

If the second display 250 is activated, the mobile terminal 100 transmits screen information (or a digital video signal) to be output to a display 251 provided at the second display 250, to the second wireless communication portion 283, through the first wireless communication portion 116. Here, as aforementioned, the digital video signal may be wirelessly transmitted through a wireless connector, as a signal of a frequency band of 60 GHz.

As aforementioned, the second display 250 may receive data (e.g., a digital video signal, etc.) from the first wireless communication portion 116, through the second wireless communication portion 283 and the second PCB 244. Here, the digital video signal may be converted into data which can be output from the second display 250, by a data converter 282. For instance, the second display 250 may be configured as an LCD panel. Here, a digital video signal of a DP format, received from the mobile terminal 100 may be converted into a data form (an MIPI format) which can be received by the LCD panel by the data converter 282, and then may be transferred to be output to the display 251.

A type of data transceived through the first and second wireless communication portions 116, 283 may be preset. For instance, only data corresponding to a video signal may be transceived through the first and second wireless communication portions 116, 283.

Here, signals required to be transmitted between the mobile terminal 100 and the second display 250, such as a communication control signal, a touch signal and a brightness control signal, except for a video signal, can be transceived via first and second signal processors 181, 281 through a multi-input channel, and then by passing through the first PCB 243 and the power terminal (e.g., the pogo-pin 249). An initialization of the second display 250, etc. may be controlled by a controller included in the second display 250.

Hereinafter, a screen control method between the first display provided at the mobile terminal and the second display provided at the case, in the electronic device 300 according to the present disclosure will be explained in more detail with reference to FIGS. 5A to 5H.

Figure 5A:
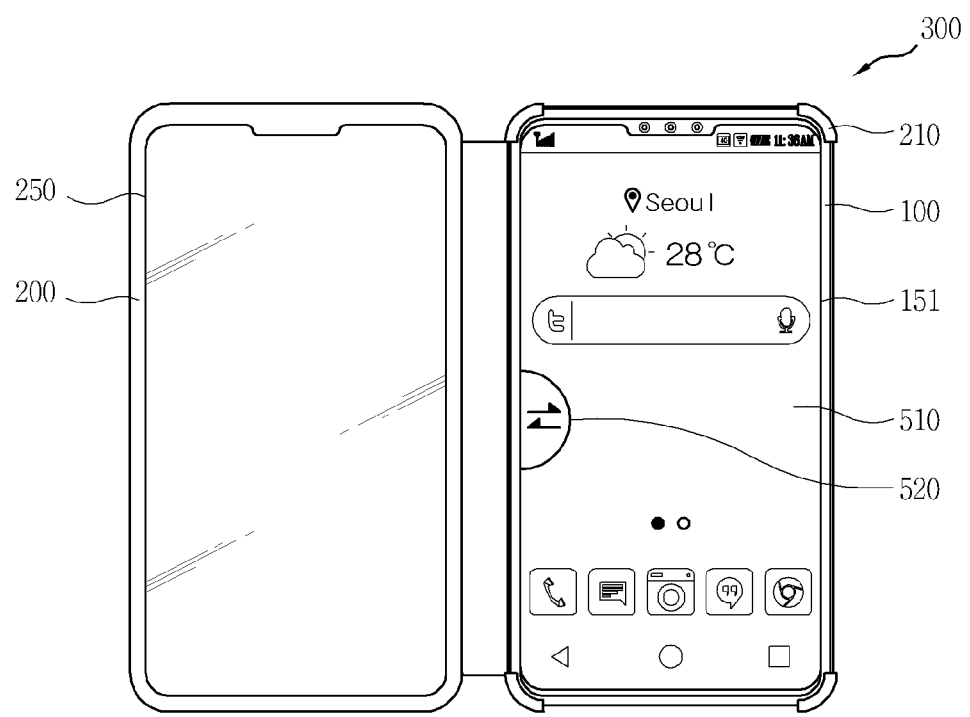

Referring to FIG. 5A, the first display 151 provided at the mobile terminal 100 is in an activated state, and the second display 250 provided at the case 200 is in an inactivated state.

In an embodiment, if the electronic device 300 is converted into an open state from a closed state, the first display 151 may be in an activated state, and a home screen 510 may be output, for instance.

In the case that the electronic device 300 is converted into an open state from a closed state, the second display 250 may maintain the inactivated state until an input is applied, even if an operation current is supplied to the second display 250. Here, the input is an input for waking-up the second display 250, and may be a touch input applied to the second display 250 (e.g., a tap/a double tap, hereinafter, a 'knock knock function'), for instance.

If a touch input is applied to the second display 250, a touch signal corresponding to the touch input is transmitted to the first wireless communication portion 116, through the second wireless communication portion 283 (refer to FIG. 4). Then, the controller 180 of the mobile terminal determines whether the touch signal received through the first wireless communication portion 116 corresponds to a preset type of touch. If the touch signal is the preset type of touch (e.g., a tap/a double tap) as a result of the determination, the controller 180 generates a control signal for converting the second display 250 into an activated state, and transmits the control signal to the second display 250 through the first and second wireless communication portions 116, 283.

In another embodiment, if the electronic device 300 is converted into an open state from a closed state, both of the first and second displays 151, 250 may be in an activated state. In this case, a first home screen may be output to the first display 151, and a second home screen different from the first home screen, or a preset screen may be output to the second display 250, for instance.

An icon 520 indicating the existence of hidden menus related to a control of the second display 250 may be displayed on one region of the home screen 510 output to the first display 151, e.g., an edge region. The icon 520 may have a position change or may have its displayed state on the first display 151 hidden, by a drag touch input.

The controller of the mobile terminal 100 may display hidden menus on the first display 151, based on a touch input applied to the displayed icon 520. An image (→) which guides a drag direction of a touch input for displaying hidden menus may be displayed on the icon 520.

For instance, as shown in FIG. 5B, in a state that the home screen 510 has been output to the first display 151, and an execution screen 530 of a web application has been output to the second display 250, if a touch input applied to the icon 520 of the home screen 510 is dragged from an edge region towards a central region of the first display 151, hidden menus are displayed.

The displayed menus provide various functions to control the first and second displays 151, 250 in an interworked manner, based on an input applied to the first display 151. For instance, as shown in FIG. 5B, there may be provided a screen conversion menu 521, a screen sending menu 522, a screen importing menu 523, a main screen saving menu 524, and a dual screen off menu 525. However, the present disclosure is not limited to this, but a larger number of different menus may be displayed.

FIGS. 5C to 5F show, in detail, various functions to control the first and second displays 151, 250 in an interworked manner, based on a touch input applied to menus displayed on the first display 151.

Hereinafter, FIG. 5C shows an operation corresponding to a function to convert a screen displayed on the first display 151 and a screen displayed on the second display 250 to each other.

Referring to FIG. 5C, first screen information (e.g., the home screen 510) may be output to the first display 151, and second screen information (e.g., an execution screen 530 of a web application) may be output to the second display 250.

In the state that different pieces of screen information have been output to the first and second displays 151, 250, if a touch input is applied to the screen conversion menu 521 among the menus displayed on the first display 151, the home screen 510 being output to the first display 151 is moved to the second display 250. And the execution screen 530 being output to the second display 250 is moved to the first display 151.

For this, the controller of the mobile terminal 100 moves a task corresponding to the home screen 510 being output to the first display 151, to a memory stack allocated for the second display 250. And the controller of the mobile terminal 100 moves a task corresponding to the execution screen 530 being output to the second display 250, to a memory stack for the first display 151.

After the first and second displays 151, 250 undergo a mutual screen conversion, if the screen conversion menu 521 is selected by an input for displaying hidden menus, the original screen is restored.

For this, the controller of the mobile terminal 100 moves a most recently inputted task from the memory stack allocated for the second display 250, to the memory stack for the first display 151. At the same time, the controller of the mobile terminal 100 moves a most recently inputted task from the memory stack for the first display 151, to the memory stack allocated for the second display 250.

Although not shown, if the screen sending menu 522 is selected from the first display 151, only a screen being output to the first display 151 is moved to the second display 250.

For this, the controller of the mobile terminal 100 moves a task corresponding to the screen being output to the first display 151, to the memory stack allocated for the second display 250. Here, a screen corresponding to a next task of the memory stack for the first display 151 is output to the first display 151. If there is no next task, a home screen may be output.

The screen importing menu 523 on the first display 151 is activated when the second display 250 is in an activated state and at least the screen sending menu 522 has been executed.

If the screen importing menu 523 is selected when the above conditions are satisfied, a screen being output to the first display 151 displayed on the second display 250 is re-displayed on the first display 151. And a screen being output to the second display 250 before the screen of the first display 151 is imported is re-output to the second display 250.

For this, the controller of the mobile terminal 100 moves a task corresponding to the screen being output to the second display 250, to the memory stack for the first display 151.

Hereinafter, FIG. 5D shows an operation corresponding to a function to convert only a screen displayed on the first display 151, to a saving mode.

If a touch input is applied to the main screen saving menu 524 among the menus displayed on the first display 151, a control signal corresponding to a touch signal corresponding to the menu is generated for execution of a saving mode with respect to the first display 151.

Here, since only the first display 151 is in a saving mode, a video signal corresponding to screen information being output to the second display 250 is continuously transmitted to the second display 250 from the mobile terminal 100, through the first and second wireless communication portions 116, 283.

As the saving mode with respect to the first display 151 is executed, as shown in FIG. 5D, the brightness of the home screen 510 of the first display 151 is controlled to be dark. On the other hand, the brightness of the execution screen 530 of the second display 250 is maintained as it is.

Hereinafter, FIGS. 5E and 5F show an operation corresponding to a function to control on/off of the second display 250 by using a touch input applied to the first display 151.

Firstly, referring to FIG. 5E, if the dual screen off menu 525 displayed on the first display 151 is selected, the controller 180 of the mobile terminal transmits a control signal for converting the second display 250 to an inactivated state, to the second display 250, through the first and second wireless communication portions 116, 283. As a result, as shown in the lower drawing of FIG. 5E, the second display 250 is converted to an inactivated state.

And an icon indicating the existence of hidden menus displayed on the first display 151 (hereinafter, 'a first icon') 520 is converted into an icon indicating a locked state (hereinafter, 'a second icon') 520'.

As the second display 250 is converted into an inactivated state based on an input to the first display 151, an operation current being supplied to the second display 250 from the mobile terminal 100 through wirings provided at the case 200 may be interrupted.

However, if a memory stack with respect to the screen information being output to the second display 250 is allocated to the mobile terminal 100, the mobile terminal 100 may recognize a task corresponding to the screen information being output to the second display 250.

After the dual screen off menu 525 is selected, as shown in FIG. 5F, if a touch input applied to the second icon 520' is dragged in a predetermined direction, e.g., from an edge region of the first display 151 to a central region, only a dual screen on menu 525' is displayed.

If a touch input is applied to the dual screen on menu 525', the controller 180 of the mobile terminal transmits a control signal for converting the second display 250 to an activated state, to the second display 250, through the first and second wireless communication portions 116, 283. And the operation current is re-supplied to the second display 250 from the mobile terminal 100.

Here, the screen information 530 which was being output before the second display 250 is converted into an inactivated state may be re-output to the second display 250. For this, the controller 180 of the mobile terminal may control tasks of the memory stack allocated for the second display 250, to maintain their states. As another example, unlike FIG. 5F, a home screen may be output to the second display 250 converted to an activated state.

Once the second display 250 is in an 'on' state, the second icon 520' displayed on the first display 151 is converted into the first icon 520 indicating the existence of hidden menus.

A first screen displayed on the first display 151 may be transmitted to the second display 250, or a second screen displayed on the second display 250 may be transmitted to the first display 151, by using a preset touch gesture, without using the icon 520. Here, the preset touch gesture may be a multi-finger touch gesture.

For instance, as shown in FIG. 5G, in a state that first screen information 540 has been displayed on the first display 151 and second screen information 530 has been displayed on the second display 250, if a three-finger touch gesture applied to the second display 250 is dragged towards the first display 151, the second screen information 530 displayed on the second display 250 is transmitted to the first display 151. That is, the tasks of the memory stack allocated for the second display 250 are moved to the memory stack of the first display 151.

Accordingly, an application corresponding to the first screen information 540 displayed on the first display 151 is positioned at a background, and the second screen information 530 is displayed on the first display 151. And a screen of the application which was being executed at the background, or a home screen is displayed on the second display 250.

Similarly, as shown in FIG. 5H, in a state that the first screen information 540 has been displayed on the first display 151 and the second screen information 530 has been displayed on the second display 250, if a three-finger touch gesture applied to the first display 151 is dragged towards the second display 250, the first screen information 540 displayed on the first display 151 is transmitted to the second display 250. In this case, the tasks of the memory stack of the first display 151 are moved to the memory stack allocated for the second display 250.

Accordingly, an application corresponding to the second screen information 530 displayed on the second display 250 is positioned at a background, and the first screen information 540 is displayed on the second display 250. And a screen of the application which was being executed at the background, or a home screen is displayed on the first display 151.

In the present disclosure, implemented was a method for consecutively-viewing a screen by connection of another display device without releasing a coupled state of a multi-screen device by hardware, in a case that said another display device requests for a connection while the multi-screen device is being used.

Here, the multi-screen device includes not only the aforementioned electronic device 300 having the first and second displays 151, 250, but also a device capable of displaying multi screens on a plurality of regions divided from each other by a screen division function on one display device.

Thus, the embodiments of the present disclosure may be applied to not only the electronic device 300 having a plurality of displays, but also a display device for displaying an additional screen by dividing one display.

Generally, an external display object with respect to the multi-screen device cannot support two devices simultaneously. Accordingly, if a new display device is connected in a state that an external display object exists, a screen of the new display device is not visible. That is, an external display object is generated by depending on whether the multi-screen device has been booted/coupled. As a result, there was a problem that a coupled state of the multi-screen device should be released or the multi-screen device should be re-booted, for a connection with a new display device.

Accordingly, in order to solve such a problem, the present disclosure provides a method for consecutively-viewing a screen by connection of another display device without releasing a coupled state of a multi-screen device by hardware, in a case that said another display device requests for a connection while the multi-screen device is being used.

Figure 6A:
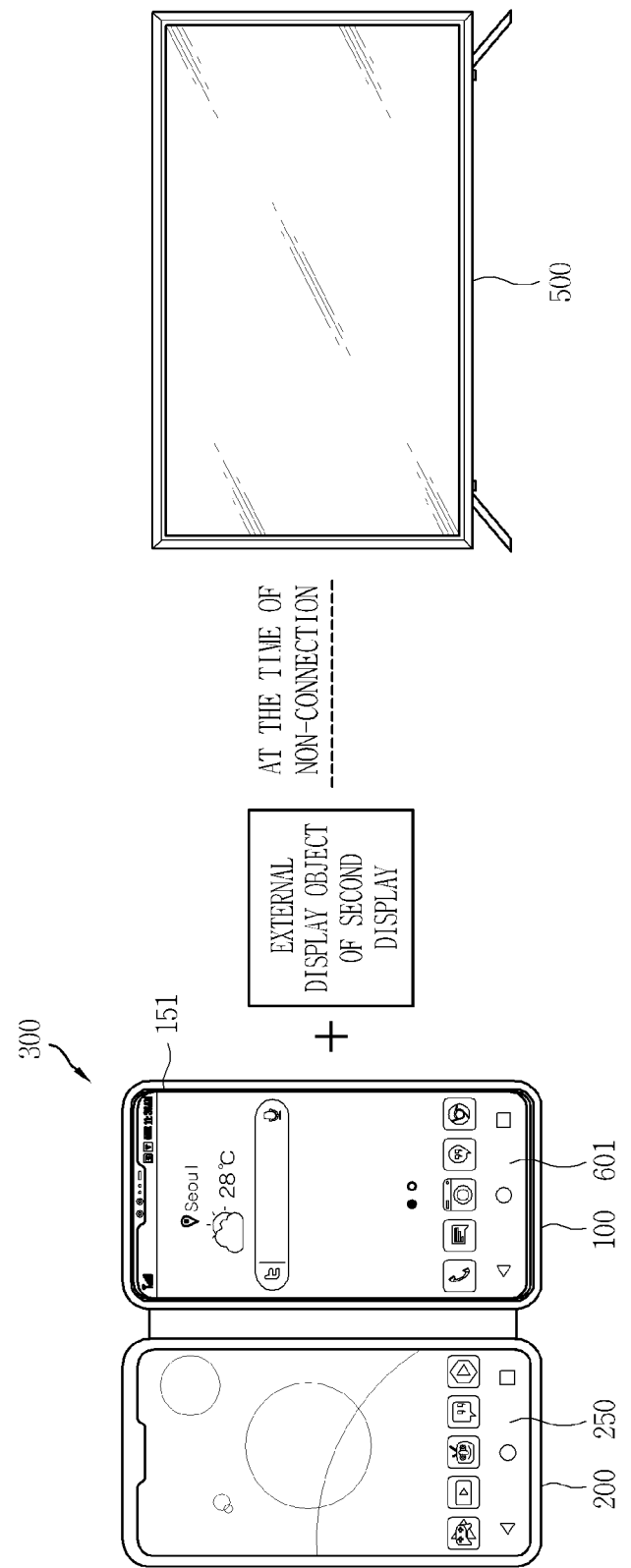
FIGS. 6A and 6B are conceptual views for explaining a connection method of a multi-screen device in a connected state between first and second displays, in an electronic device according to the present disclosure.

Firstly, referring to FIG. 6A, in the electronic device 300 according to the present disclosure, if the mobile terminal 100 is coupled to the case 200, and if both of the first display 151 provided at the mobile terminal 100 and the second display 250 provided at the case 200 are in an activated state, different screens 601, 602 may be displayed on the first and second displays 151, 250.

In this case, the electronic device 300, a multi-screen device generates an external display object with respect to the second display 250, by the controller of the mobile terminal 100. Here, there is no connection request from another display device, e.g., a third display 500.

Figure 6B:
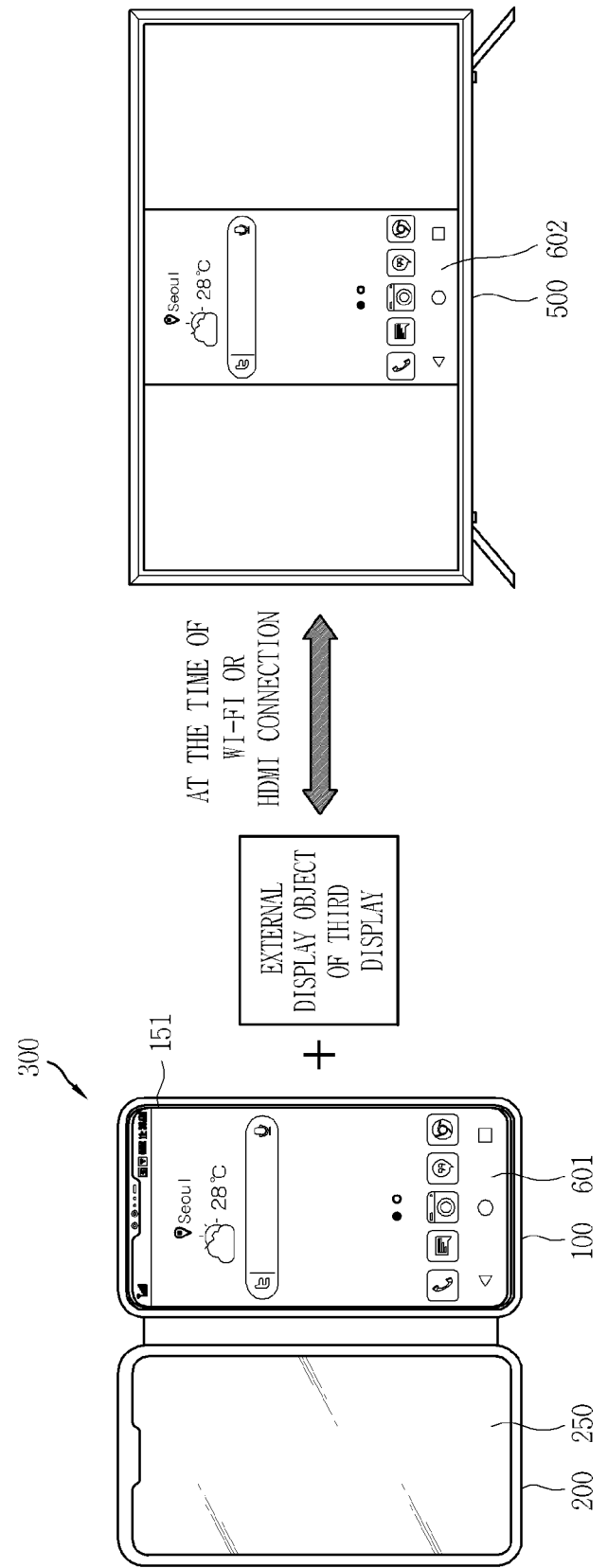

As shown in FIG. 6B, in a state that the different screens 601, 602 have been displayed on the first and second displays 151, 250 of the electronic device 300, a connection request from the third display 500 may be received.

In this case, in the present disclosure, while the coupled state between the mobile terminal 100 and the case 200 is maintained, a software control is performed in response to the connection request from the third display 500.

More specifically, the second display 250 is converted into an inactivated state, based on a release request of a relevant application or a relevant service, without a hardware release of the coupled state. As a result, the screen of the second display 250 is turned off, and then the power supply to the second display 250 is interrupted.

Then, the controller of the mobile terminal 100 removes the external display object with respect to the second display 250. And the controller informs a connectable state of the third display 500 to a relevant application or a relevant service, and generates an external display object with respect to the third display 500, based on a connection request received therefrom.

Accordingly, as shown, the same screen 602 as the screen 601 displayed on the first display 151 of the electronic device 300 is displayed on the third display 500.

The terms "coupling", "combination" and "connection" between devices disclosed in the following descriptions mean a hardware coupling which requires generation of an external display object, which may be used together.

[FIG. 7, a Representative Flowchart]

Hereinafter, a method for consecutively-viewing a screen by connection of another screen device in a maintained state of a hardware coupling of a multi-screen device will be explained in more detail with reference to the flowchart of FIG. 7.

Referring to FIG. 7, once the case 200 having the second display 250 is coupled to the mobile terminal 100 having the first display 151 (701), the controller of the mobile terminal may recognize a coupled state of the second display 250 (702).

Here, the coupling between the case 200 having the second display 250 and the mobile terminal 100 may include both a wireless connection and a physical wired connection.

For instance, as aforementioned, not only a wireless connection through Keyssa chips provided at the mobile terminal 100 and the case 200, but also a wired connection through wired communication means provided at the mobile terminal 100 and the case 200 (e.g., a connector and a connection port), a short-distance wireless communication connection such as Wi-Fi or Bluetooth (BT), etc. may be included in the "coupling".

Next, the controller of the mobile terminal outputs a signal to inform a relevant application of a usable state of the second display 250 (703). A detailed flow of the outputted signal will be explained in the following descriptions in more detail.

Once the usable state of the second display 250 is informed, the controller of the mobile terminal 100 supplies an operation power to the second display 250. As a result, the second display 250 is in a power-on state (704).

That is, in the present disclosure, when the mobile terminal 100 is coupled to the case 200, a power is not immediately supplied to the second display 250 from the mobile terminal 100, but only the coupled state is informed to an internal hierarchical structure.

The reason is as follows.

If a driving power is immediately supplied to the second display 250 from the mobile terminal 100 by depending on the "coupling", an external display object is also generated immediately. As a result, thereafter, it is impossible to additionally connect another display device without releasing the "coupling".

Thus, in the present disclosure, it is configured that an external display object with respect to the second display 250 is not generated when the case 200 having the second display 250 is coupled to the mobile terminal 100.

After the power is supplied to the second display 250, a preset screen (e.g., a home screen, an execution screen of a preset application, etc.) is output to the second display 250 (705).

After supplying the operation power to the second display 250, the controller of the mobile terminal 100 generates an external display object with respect to the second display 250, based on a request from a relevant application or a relevant service (706).

That is, a trigger subject for generating an external display object is changed to a software control from the hardware 'coupling'.

While different screens are being displayed in a coupled state between the mobile terminal 100 and the second display 250 and in an activated state of both of the first and second displays 151, 250, a connection request 707 from another display device, e.g., the third display 500 to the electronic device 300 may be received.

Here, the third display 500 may include various types of display devices (e.g., a PC device, a smart TV, etc.) connected by an HDMI port, or various means/devices mirror-casted through a mirror link.

In this case, the connection request 707 from the third display 500 may be received and recognized by the controller of the mobile terminal 100 (708).

In response to the connection request, the controller of the mobile terminal 100 requests power-off to the second display 250 (709). More specifically, the controller transfers a connection release request by a relevant application or a relevant service to the second display 250.

Then, the second display 250 converts into a power-off state in response to the request (710). Here, the coupling between the mobile terminal 100 and the case 200 is maintained (711).

Only in a released state of the power supply to the second display 250, the controller of the mobile terminal 100 removes the generated external display object with respect to the second display 250, based on a release request from a relevant application or a relevant service (712).

Then, the controller of the mobile terminal 100 outputs a signal to inform a relevant application of a usable state of the third display 500 (713). A detailed flow of the outputted signal will be explained in the following descriptions in more detail.

Once the usable state of the third display 500 is informed while the coupling of the second display 250 is maintained, the controller of the mobile terminal 100 generates an external display object with respect to the third display 500, based on a connection request from a relevant application or a relevant service (714).

And a screen corresponding to a connection state to the first display 151 of the mobile terminal 100 is output to the third display 500 (715).

As aforementioned, in the present disclosure, in a coupled state between the mobile terminal having the first display and the case having the second display, a consecutive screen viewing can be performed by connection of another display device, without a physical release. Further, generating and removing an external display object is performed by a software control, without depending on a hardware coupling or connection of the device.

Figure 8:
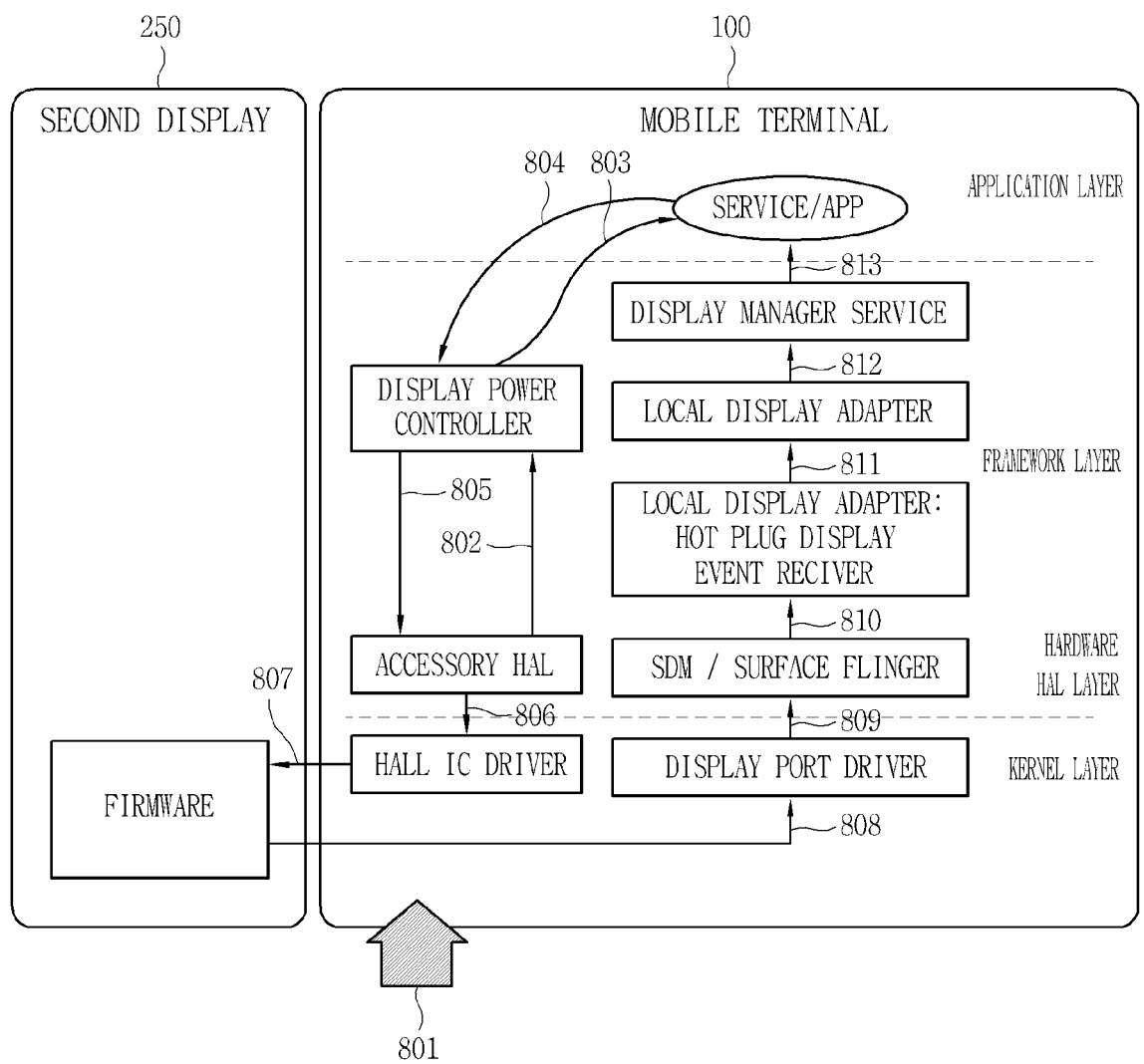
FIG. 8 is a conceptual view for explaining a process of generating an external display object based on a connection request by a service/application, in case of connecting a multi-screen device, in an electronic device according to the present disclosure.
Figure 9A:
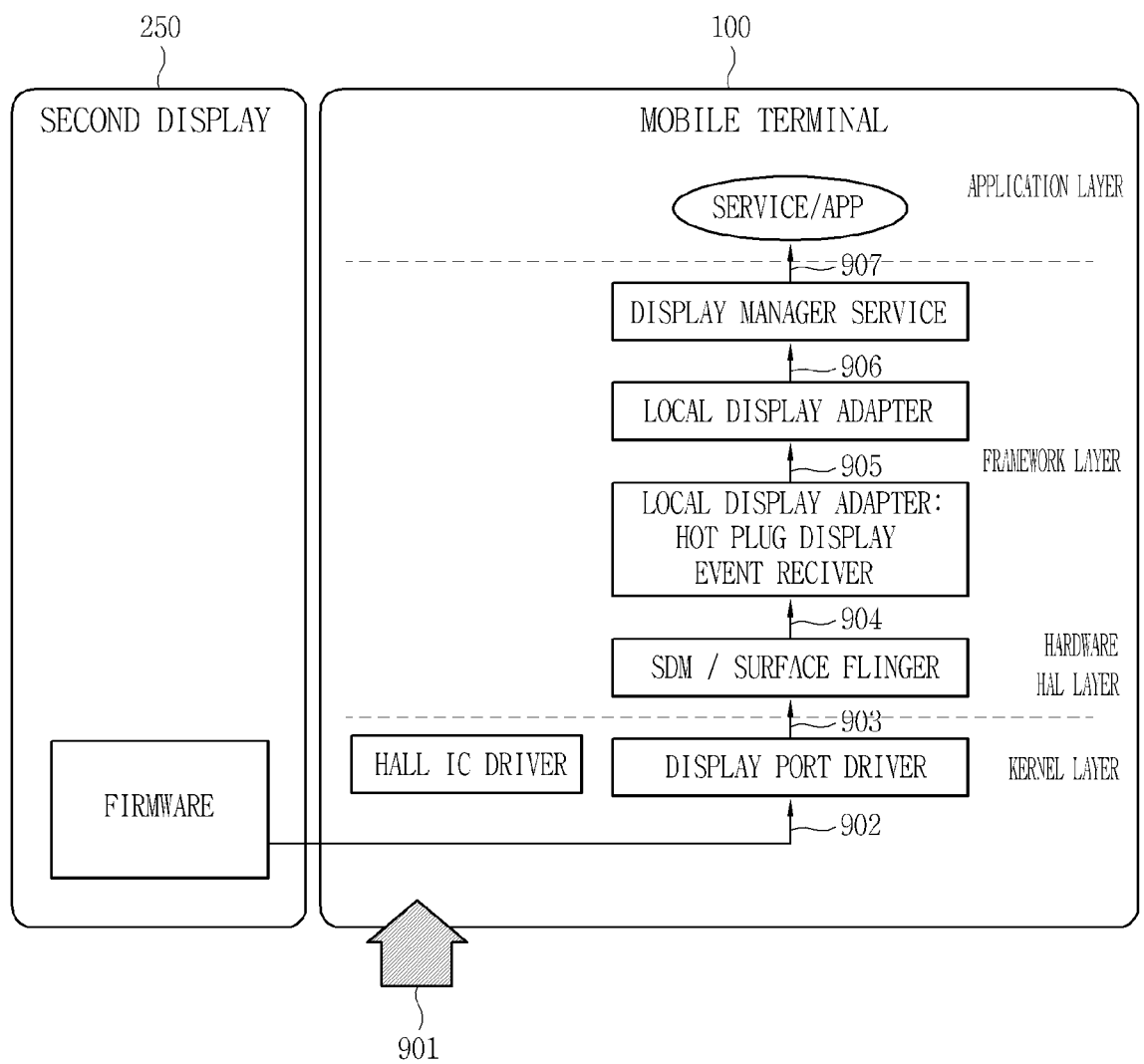
FIG. 9A is a conceptual view for explaining a process of removing an external display object when a connected state of a multi-screen device is physically released in an electronic device according to the present disclosure.
Figure 9B:
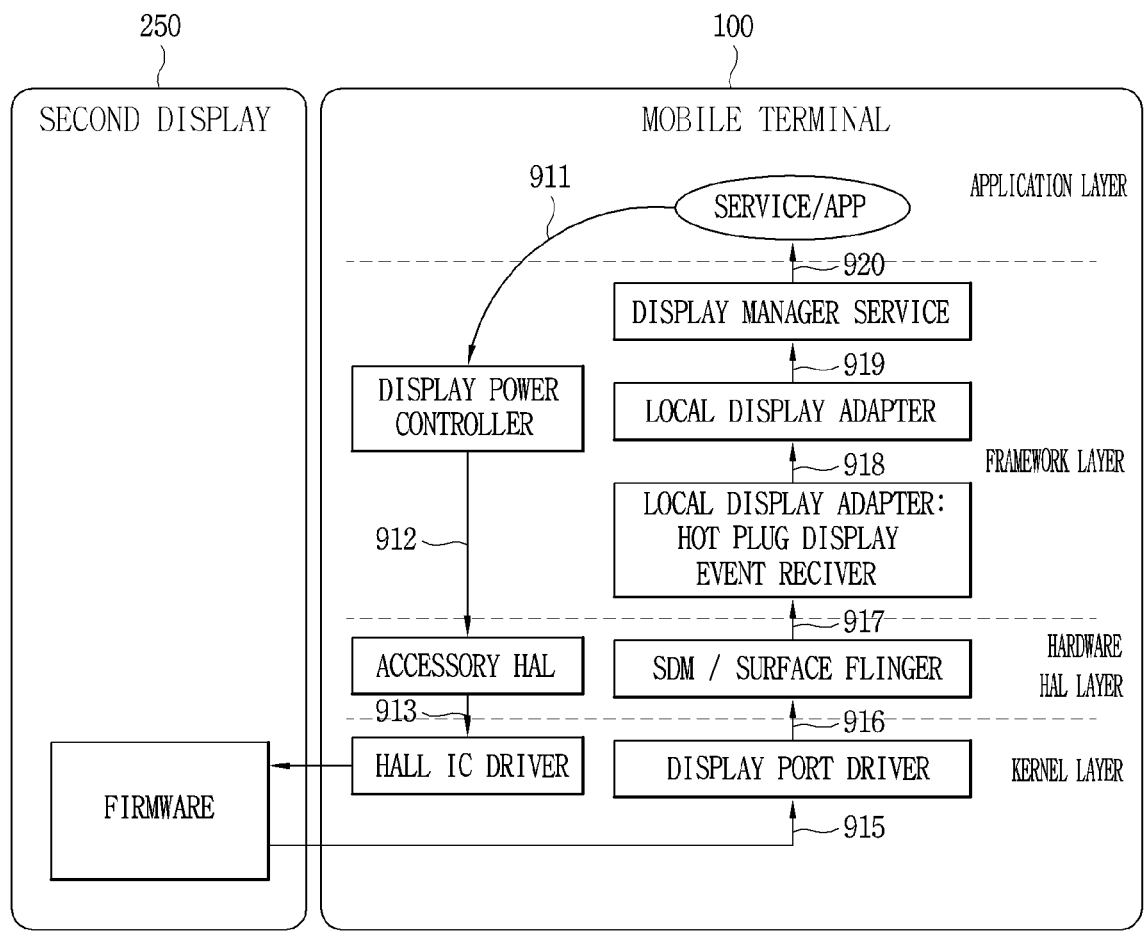
FIG. 9B is a conceptual view for explaining a process of removing an external display object based on a request by a service/application, without a physical connection release of a connected multi-screen device, in an electronic device according to the present disclosure.

Hereinafter, FIGS. 8, 9A and 9B show processes to generate/remove an external display object based on a software control, in the electronic device 300 according to the present disclosure.

For this, a Kernel Layer, a Hardware Hal Layer, a Framework Layer, and an Application Layer were shown as layers of a software structure. However, the present disclosure is not limited to this. That is, a structure of a larger number of layers or a smaller number of layers may be implemented.

In the following descriptions, a layer where an external display object is generated is not limited to the layers to be explained, and it should be noted that this is not the gist of the present disclosure.

[FIG. 8, at the Time of Coupling Between the Mobile Terminal and the Case]

Firstly, processes to generate an external display object based on a connection request by a relevant service/application, at the time of a hardware coupling of a multi-screen device, according to an embodiment of the present disclosure will be explained in more detail with reference to FIG. 8.

FIG. 8 shows a signal flow between the mobile terminal 100 and the second display 250 when the mobile terminal 100 and the second display 250 are coupled to each other, and when the second display 250 is used, in the electronic device 300 according to the present disclosure.

Once the mobile terminal 100 and the second display 250 are coupled to each other (801), an accessory Hal of the mobile terminal 100 outputs a signal informing a coupled state of the second display 250 of the case (802).

The signal is transferred to a relevant application/relevant service, through a display power controller. That is, a usable state of the second display 250 is informed (803).

Next, a power on request with respect to the second display 250, from the relevant application/relevant service, is transferred to the display power controller (804).

Then, the display power controller transfers the power on request to the accessory Hal (805). And the accessory Hal which has received the power on request transfers it to a hall IC driver (806).

Then, the hall IC driver applies a power to the second display 250.

This is definitely distinguished from the conventional art where if the mobile terminal 100 and the second display 250 are coupled to each other (801), a power is immediately applied to the second display 250 through the hall IC driver of the mobile terminal 100. According to the present disclosure, the relevant application and the relevant service of the present disclosure are provided with state information, after a power is supplied to the second display 250 and an external display object is generated.

Referring to FIG. 8 back, if a power is supplied to the second display 250, the screen of the second display 250 is turned on, and a firmware applies an HPD GPIO of a high state (808).

Then, a display port driver recognizes the high state of the HPD GPIO, and then sends a UEvent to a hardware Hal layer (809).

After an SDM receives the Uevent, an external display object is generated, and a hot plug connect callback signal is transmitted (810). A local display adapter receives the callback signal (811).

Next, the local display adapter generates a proxy of the external display object and performs a configuration, and then informs a display manager service (812).

Here, it was explained that the proxy of the external display object is generated at the framework layer, under an assumption of an HDMI connection. However, the generation may be performed at another layer. For instance, in case of a mirror-cast, the proxy of the external display object may be generated at the hardware Hal layer.

Finally, the display manager service transmits state information to a relevant application/relevant service being observed (813). This is definitely distinguished from the conventional art where only final state information is received in a state that a relevant application and a relevant service do not recognize the "coupling".

In the present disclosure, when the mobile terminal 100 and the second display 250 are coupled to each other, an external display object is not generated, but a generable state is informed. As a result, a triggering subject is changed to a software control from a hardware coupling. Accordingly, an external display object is generated when there is a connection request from a relevant application/relevant service.

[FIGS. 9A and 9B, a Physical Release of a Coupling Between the Mobile Terminal and the Case, and a Release by Request]

Hereinafter, processes to remove an external display object when a hardware coupling of a multi-screen device is released physically or by request according to an embodiment of the present disclosure will be explained in more detail with reference to FIGS. 9A and 9B.

Firstly, FIG. 9A shows a signal flow between the mobile terminal 100 and the second display 250 when a coupling between the mobile terminal 100 and the second display 250 is released physically, in the electronic device 300 according to the present disclosure.

Referring to FIG. 9A, if a coupling between the mobile terminal 100 and the second display 250 is released (901), the firmware of the second display 250 changes the high state of the HPD GPIO into a low state (902). This is informed to the display port driver.

The display port driver recognizes the low state of the HPD GPIO, and sends a UEvent to the SDM (903). After the SDM receives the Uevent, the external display object is removed, and a hot plug disconnect callback signal is transmitted (904).

The local display adapter receives the callback signal (905), removes a proxy of the external display object, and transfers it to the display manager service (906).

The display manager service transmits state information to a relevant application/relevant service being observed (907).

In the case that the mobile terminal 100 and the second display 250 are physically decoupled from each other, the conventional logic to remove an external display object may be applied effectively.

FIG. 9B shows a signal flow between the mobile terminal 100 and the second display 250 when a connection release is requested in a maintained state of a coupling between the mobile terminal 100 and the second display 250, in the electronic device 300 according to the present disclosure.

Such a connection release request may be performed under an assumption that the second display 250 is not used in a maintained state of a coupling of the second display 250, or another display device is connected.

Firstly, a display off request with respect to the second display 250, from a relevant application/relevant service of the mobile terminal 100, is received (911).

Next, the display power controller performs a display off of the second display 250, and then requests a power off of the second display 250 to the accessory Hal (912).

Next, the accessory Hal requests a power off to the hall IC driver (913). Then, the hall IC driver releases a power of the second display 250 (914).

Once the power of the second display 250 is turned-off, the firmware of the second display 250 changes the high state of the HPD GPIO into a low state (915). The state is informed to the display port driver of the mobile terminal 100 (915).

The display port driver recognizes the low state of the HPD GPIO, and sends a Uevent to the SDM (916).

After receiving the Uevent, the SDM removes the external display object, and transmits the hot plug disconnect callback signal (917). The local display adapter receives the callback signal (918), removes the proxy of the external display object, and sends it to the display manager service (919).

Finally, the display manager service transmits state information to a relevant application/relevant service being observed (920).

As aforementioned, in the present disclosure, an external display object may be removed for a connection to another display device in a seamless manner, if there is a connection request from a relevant application/relevant service, even if there is no physical decoupling.

Figure 10:
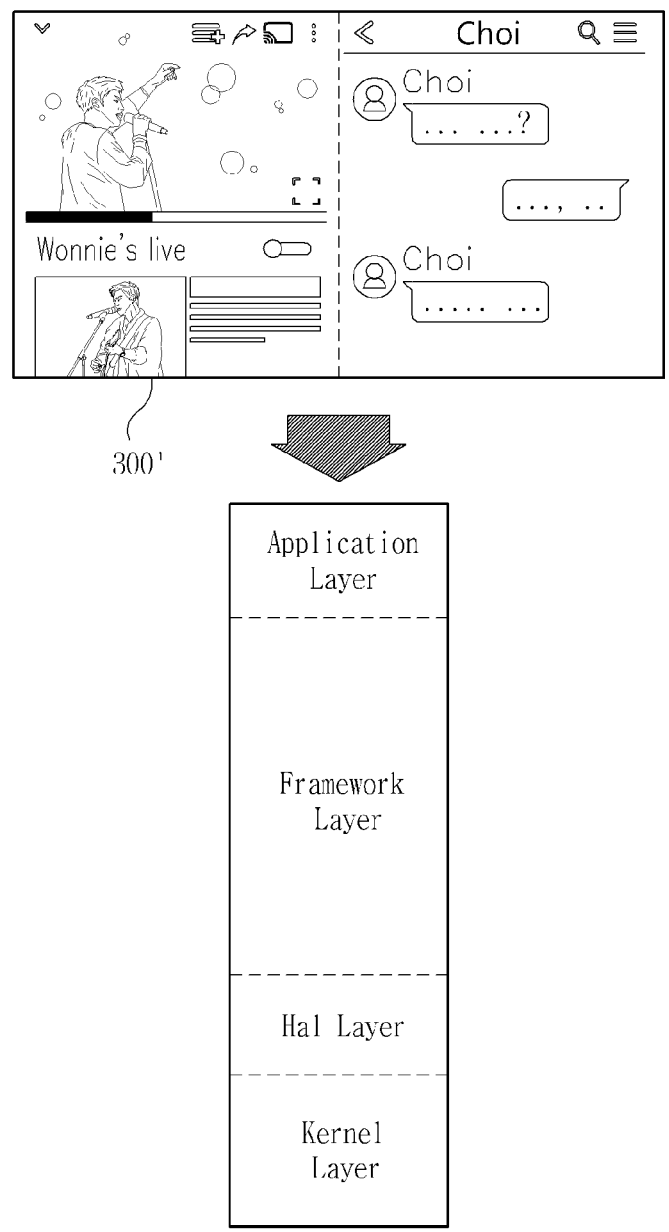
FIG. 10 is a conceptual view for explaining applications of the aforementioned embodiments in an electronic device where one display is used as a multi-screen, according to a modification embodiment of an electronic device of the present disclosure.

FIG. 10 is a modification embodiment of the electronic device according to the present disclosure, and is a conceptual view for explaining that the aforementioned embodiments are applied to an electronic device where one display is used as a multi-screen.

In case of the aforementioned game pad, a touch event generated from the game pad is applied to not only a screen of the game pad, but also another display where a game screen being played is displayed.

The present disclosure may be applied to an instance that a touch event generated from one screen is transferred to another screen, in a state that the two screens relevant to each other are being displayed on one or two displays.

Thus, as aforementioned above, the present disclosure may be applied to not only an instance that one electronic device is driven as a mobile terminal is mounted to a case having a display, but also an instance that two displays disposed on separated positions are interworked with each other through a wireless/wired connection, when different screens are displayed on a plurality of regions of one display.

Referring to FIG. 10, if different screens have been displayed on an electronic device 300' having one display, it is impossible to view a screen consecutively without an additional DP port, because an external display object is already generated.

However, in the present disclosure, even if an additional DP port is not provided, an external display object is removed by turning off one screen or by stopping a play function, through the aforementioned software control, according to a connection request from another display device.

And a connectable state of another display device is informed to a relevant application/relevant service. Next, an external display object with respect to said another display device is generated, based on a request from the relevant application/relevant service. This may allow a connection of another display device in a seamless manner, without directly turning off or re-booting one screen by a user.

In the mobile terminal and the electronic device having the mobile terminal according to the present disclosure, a screen consecutive viewing can be preformed through a connection of another display device, without a physical connection release, in a coupled state between the mobile terminal having the first display and the case having the second display. Further, generating and removing an external display object is performed by a software control, without depending on a hardware coupling or connection of the device. Thus, additional configurations or components such as a plurality of DP ports are not required.

What is claimed is:

1. An electronic device, comprising:
a case;
a controller; and
a mobile terminal having a first display, wherein the mobile terminal comprises a terminal body coupled to the case,
wherein the case comprises:
a first body formed to accommodate at least part of the terminal body;
a second body having a second display; and
a wiring portion configured to electrically connect the first body and the second body such that data received at the first body from the mobile terminal is transmitted to the second display, and
wherein the controller is configured to:
recognize an electrically connected state of the second display;
cause an indication of a usable state of the second display to be sent to an application in response to recognizing the electrically connected state of the second display;
cause an operation power to be supplied to the second display based on receiving a first request signal from the application;
receive a second request signal from the application for changing an active state of the second display into an inactive state, wherein the second request signal is received in response to a first connection request being received at the electronic device from a third display; and
cease supplying the operation power to the second display in response to the second display changing from the active state into the inactive state based on receiving the second request signal.

2. The electronic device of claim 1, wherein the controller is further configured to cause the second display to display a first external display object based at least in part on the operation power being supplied to the second display and the electrically connected state of the second display being recognized.

3. The electronic device of claim 2, wherein the controller is further configured to remove a display of the first external display object on the second display based on a connection release request from the application in response to the supply of the operation power being interrupted and while a coupling of the terminal body and the case is maintained.

4. The electronic device of claim 3, wherein the controller is further configured to:
cause a second indication of a usable state of the third display to the application while the coupling of the terminal body and the case is maintained; and cause the third display to display a second external display object based on receiving a second connection request from the application.

5. The electronic device of claim 2, wherein the controller is further configured to remove a display of the first external display object on the second display in response to recognizing a coupling released state between the terminal body and the case.

6. The electronic device of claim 1, wherein the controller is further configured to cause a third indication indicating the electrically connected state of the second display to the application in response to recognizing the electrically connected state of the second display.

7. A mobile terminal, comprising:
a controller;
a first display;
a terminal body configured to be coupled to a case comprising a second external display; and
an electrical connection portion configured to be electrically connected to a wiring portion disposed at the case when the terminal body is coupled to the case;
wherein the controller is configured to:
recognize an electrically connected state of the second external display via electrical connection between the electrical connection portion and the wiring portion;
provide, in response to recognizing the electrically connected state of the second external display, an indication of a usable state of the second external display to an application being executed at the mobile terminal;
cause an operation power to be supplied to the second external display based on receiving a first request signal from the application;
receive a second request signal from the application for changing an active state of the second external display into an inactive state, wherein the second request signal is received in response to a first connection request being received at the mobile terminal from a third external display; and cease supply of the operation power to the second external display in response to the second external display changing from the active state into the inactive state based on receiving the second request signal.

8. The mobile terminal of claim 7, wherein the controller is further configured to cause the second external display to display a first external display object based at least in part on the operation power being supplied to the second external display and the electrically connected state of the second external display being recognized.

9. The mobile terminal of claim 8, wherein the controller is further configured to remove a display of the first external display object on the second external display based on a connection release request from the application in response to the supply of the operation power being interrupted and while a coupling of the terminal body and the case is maintained.

10. The mobile terminal of claim 9, wherein the controller is further configured to:
cause a second indication of a usable state of a third external display to the application while the coupling of the terminal body and the case is maintained; and
cause the third external display to display a second external display object based on receiving a second connection request from the application.

11. The mobile terminal of claim 8, wherein the controller is further configured to remove a display of the first external display object on the second external display in response to recognizing a coupling released state between the terminal body and the case.

12. The mobile terminal of claim 7, wherein the controller is further configured to cause a third indication indicating the electrically connected state of the second external display to the application in response to recognizing the electrically connected state of the second external display.

* * * * *